United States Patent
Takaoka et al.

(10) Patent No.: US 10,623,168 B2
(45) Date of Patent: *Apr. 14, 2020

(54) COMMUNICATION APPARATUS AND COMMUNICATION METHOD

(71) Applicant: Sun Patent Trust, New York, NY (US)

(72) Inventors: Shinsuke Takaoka, Osaka (JP); Daichi Imamura, Osaka (JP); Kenichi Miyoshi, Osaka (JP)

(73) Assignee: Sun Patent Trust, New York, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/988,779

(22) Filed: May 24, 2018

(65) Prior Publication Data
US 2018/0270040 A1    Sep. 20, 2018

Related U.S. Application Data

(63) Continuation of application No. 15/415,070, filed on Jan. 25, 2017, now Pat. No. 10,009,162, which is a (Continued)

(30) Foreign Application Priority Data

Jan. 8, 2010 (JP) ................ 2010-003332

(51) Int. Cl.
*H04L 5/00* (2006.01)
*H04L 25/03* (2006.01)
(Continued)

(52) U.S. Cl.
CPC .......... *H04L 5/0073* (2013.01); *H04B 7/024* (2013.01); *H04J 11/0053* (2013.01);
(Continued)

(58) Field of Classification Search
CPC ..... H04B 7/024; H04L 5/0035; H04L 5/0073; H04L 5/0023; H04L 5/0048; H04W 72/042
See application file for complete search history.

(56) References Cited

U.S. PATENT DOCUMENTS

2009/0111477 A1    4/2009 Tsutsui
2009/0286482 A1    11/2009 Gorokhov et al.
(Continued)

FOREIGN PATENT DOCUMENTS

CN    101534527 A    9/2009
JP    2009-105746 A    5/2009
(Continued)

OTHER PUBLICATIONS

Chinese Search Report for Application No. 201180005493.2 dated Jul. 3, 2014.
(Continued)

*Primary Examiner* — Jung H Park
(74) *Attorney, Agent, or Firm* — Seed IP Law Group LLP

(57) ABSTRACT

A communication apparatus comprises a generator that generates frequency resource position information corresponding to a first information which is based on the communication quality information received from user equipments, the frequency resource position information indicating validity or invalidity of the first information for each frequency resource, and a transmitter that transmits the first information, the frequency resource position information and a cell ID which the frequency resource position is applied, to another communication apparatus via a backhaul.

23 Claims, 24 Drawing Sheets

Related U.S. Application Data continuation of application No. 14/795,334, filed on Jul. 9, 2015, now Pat. No. 9,602,267, which is a continuation of application No. 13/520,406, filed as application No. PCT/JP2011/000060 on Jan. 7, 2011, now Pat. No. 9,137,685.

(51) Int. Cl.

| | | |
|---|---|---|
| *H04W 72/08* | (2009.01) | |
| *H04B 7/024* | (2017.01) | |
| *H04W 24/02* | (2009.01) | |
| *H04L 1/00* | (2006.01) | |
| *H04W 48/00* | (2009.01) | |
| *H04J 11/00* | (2006.01) | |
| *H04W 72/04* | (2009.01) | |
| *H04W 92/20* | (2009.01) | |
| *H04W 28/06* | (2009.01) | |

(52) U.S. Cl.
CPC ............ *H04J 11/0079* (2013.01); *H04L 1/00* (2013.01); *H04L 5/0023* (2013.01); *H04L 5/0035* (2013.01); *H04L 5/0082* (2013.01); *H04L 25/03343* (2013.01); *H04L 25/03904* (2013.01); *H04L 25/03955* (2013.01); *H04W 24/02* (2013.01); *H04W 48/00* (2013.01); *H04W 72/042* (2013.01); *H04W 72/08* (2013.01); *H04L 2025/03777* (2013.01); *H04W 28/06* (2013.01); *H04W 92/20* (2013.01)

(56) References Cited

U.S. PATENT DOCUMENTS

| | | | |
|---|---|---|---|
| 2009/0286562 A1 | 11/2009 | Gorokhov | |
| 2010/0189038 A1 | 7/2010 | Chen et al. | |
| 2010/0265837 A1 | 10/2010 | Sakai | |
| 2010/0273514 A1 | 10/2010 | Koo et al. | |
| 2010/0278109 A1* | 11/2010 | Papasakellariou | .... H04L 5/0037 370/328 |
| 2010/0284351 A1 | 11/2010 | Liang et al. | |
| 2010/0311349 A1* | 12/2010 | Koo | ...................... H04W 16/02 455/67.11 |
| 2011/0028156 A1 | 2/2011 | Zhu et al. | |
| 2011/0034192 A1 | 2/2011 | Lim et al. | |
| 2011/0038436 A1 | 2/2011 | Kim et al. | |
| 2011/0105136 A1 | 5/2011 | Choi | |
| 2011/0105138 A1 | 5/2011 | Morimoto et al. | |
| 2011/0201277 A1 | 8/2011 | Eguchi | |
| 2011/0268068 A1 | 11/2011 | Jian et al. | |
| 2011/0317641 A1 | 12/2011 | Noh et al. | |
| 2012/0207055 A1 | 8/2012 | Kang et al. | |
| 2013/0279403 A1 | 10/2013 | Takaoka et al. | |
| 2014/0321346 A1 | 10/2014 | Chung et al. | |

FOREIGN PATENT DOCUMENTS

| | | |
|---|---|---|
| JP | 2009-246717 A | 10/2009 |
| WO | 2009033358 A1 | 3/2009 |
| WO | 2009072408 A1 | 6/2009 |
| WO | 2009/120048 A2 | 10/2009 |
| WO | 2009/140637 A2 | 11/2009 |
| WO | 2011/083774 A1 | 7/2011 |

OTHER PUBLICATIONS

R1-093780, Estimation of extended PMI feedback signaling required for user intra-cell and inter-cell coordination, 3GPP TSG RAN WG1 #58bis, Miyazaki, Japan, Oct. 12-16, 2009.
R1-093781, Consideration on performance of coordinated beamforming with PMI feedback, 3GPP TSG RAN WG1 #58bis, Miyazaki, Japan, Oct. 12-16, 2009.
3GPP TS 36.213 V8.7.0 Physical layer procedures (May 2009).
3GPP TSG RAN WG1 Meeting #59, R1-094792 Jeju, Korea, Nov. 9-13, 2009, LG Electronic, "Feedback Information for downlink coordinated scheduling/beamforming".
International Search Report for PCT/JP2011/000060 dated Apr. 12, 2011.
Alcatel-Lucent, "UE PMI feedback signaling for user pairing/coordination," R1-083759, 3GPP TSG RAN WG1 #54bis, Agenda Item: 11, Prague, Czech Republic, Sep. 29-Oct. 3, 2008, 3 pages.
ETRI, "Multi-cell PMI coordination for downlink CoMP," R1-094313, 3GPP TSG RAN WG1 Meeting #58bis, Agenda Item: 7.5, Miyazaki, Japan, Oct. 12-16, 2009, 4 pages.
Potevio, "Considerations on CoMP switching and scenarios," R1-094806, 3GPP TSG RAN WG1 meeting #59, Agenda Item: 7.5.3, Jeju, Korea, Nov. 9-13, 2009, 4 pages.

\* cited by examiner

FIG.16A

| PMI#1 | PMI#2 | PMI#4 | |
|---|---|---|---|
| PMI#1 | PMI#0 | PMI#2 | FREQUENCY |

PRB NUMBER → #0  #1  #2  #3
NUMBER OF PMIs → 2   2   2   2

(A) WHERE THRESHOLD VALUE IS LARGE AND RNTP IS 1, THE NUMBER OF PMI INFORMATION IS 2 (LARGE)

FIG.16B

| PMI#1 | PMI#0 | PMI#2 | FREQUENCY |
|---|---|---|---|

PRB NUMBER → #0  #1  #2  #3
NUMBER OF PMIs → 1   1   1   1

(B) WHERE THRESHOLD VALUE IS SMALL AND RNTP IS 1, THE NUMBER OF PMI INFORMATION IS 1 (SMALL)

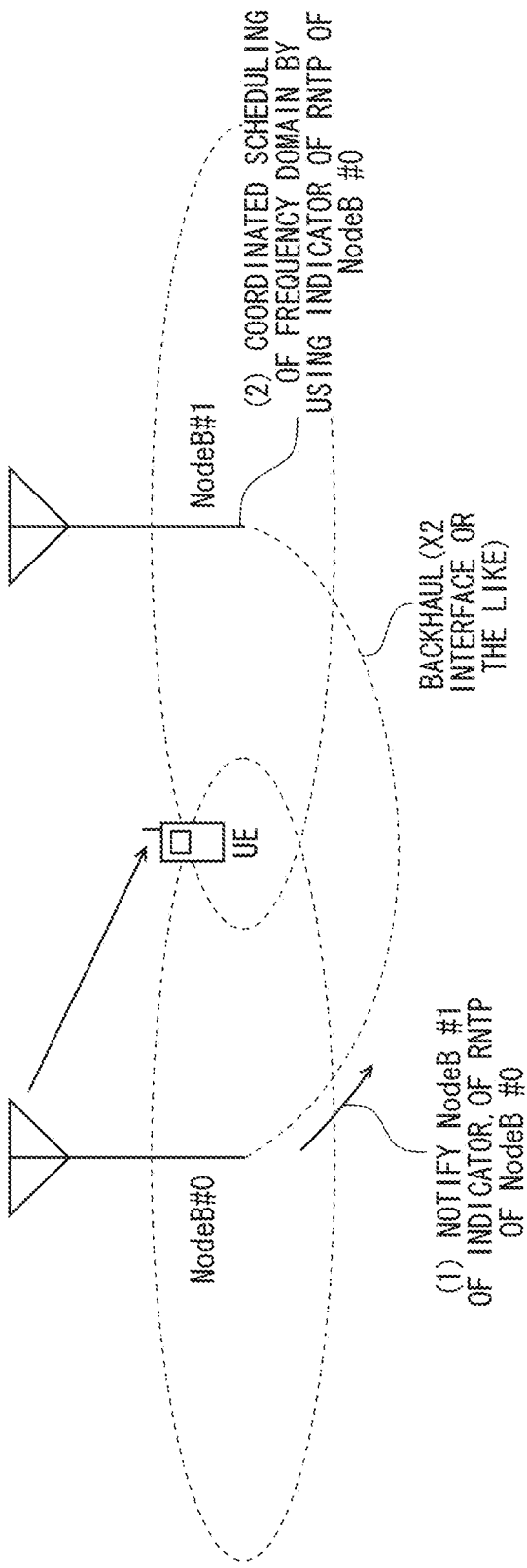
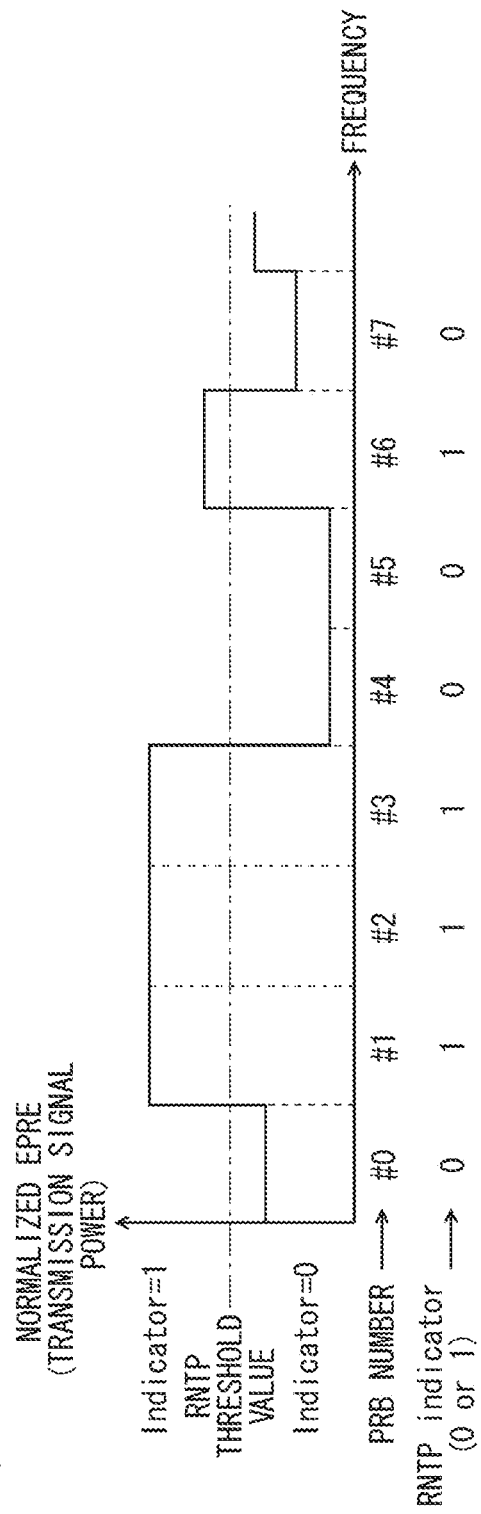
FIG. 22A
FIG. 22B

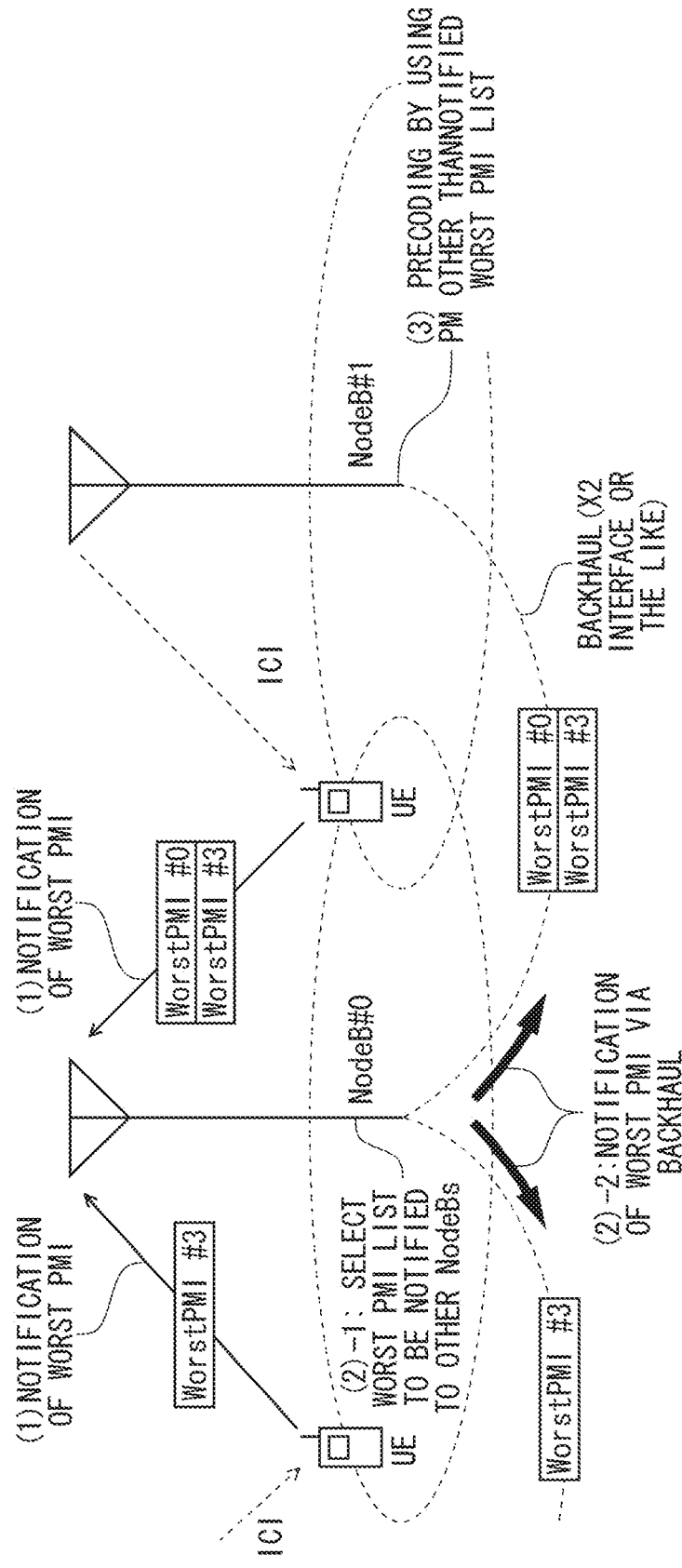

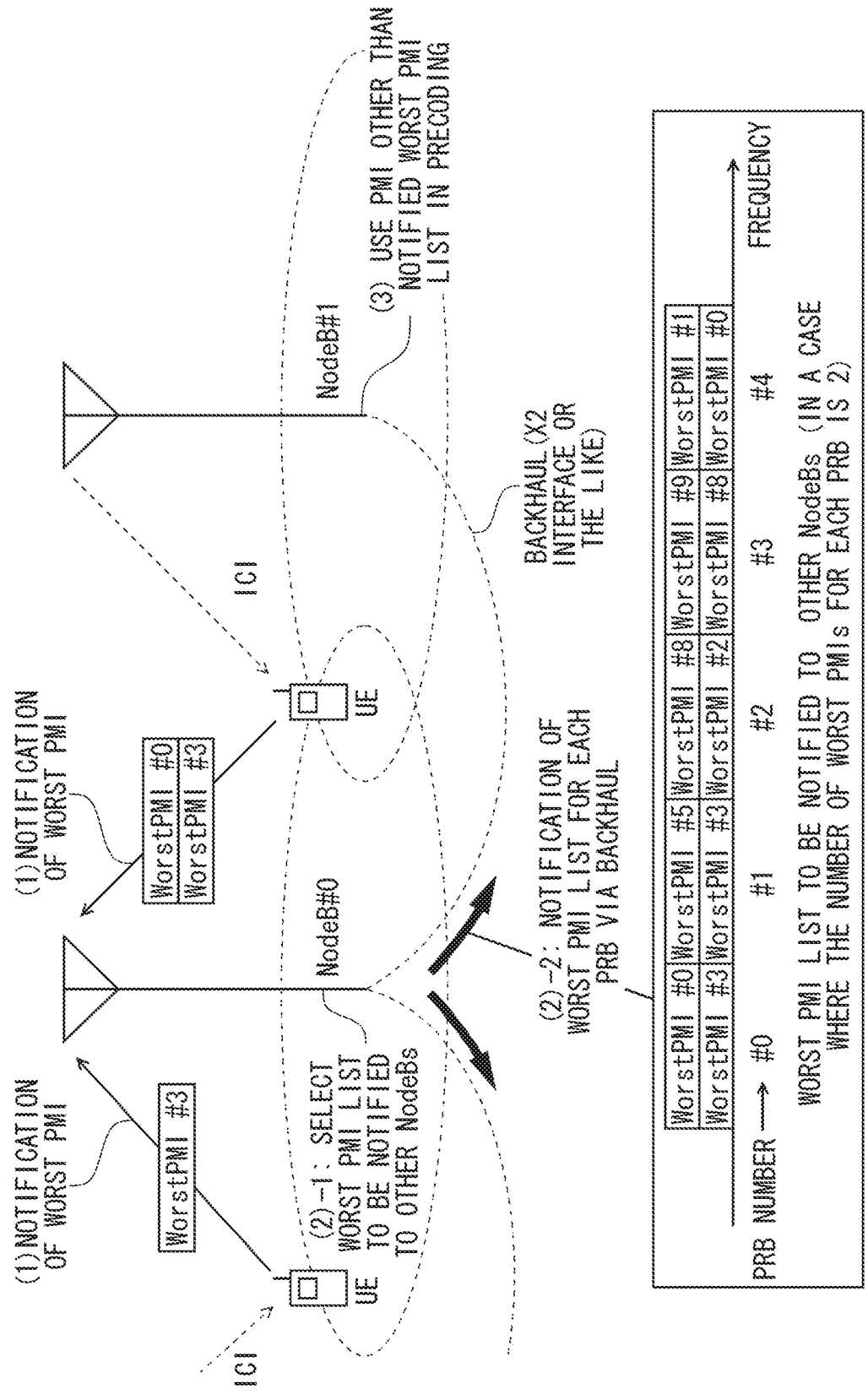

COMMUNICATION APPARATUS AND COMMUNICATION METHOD

CROSS REFERENCE TO RELATED APPLICATIONS

This application is a continuation of U.S. patent application Ser. No. 15/415,070 filed on Jan. 25, 2017, now issued as U.S. Pat. No. 10,009,162, which is a continuation of U.S. patent application Ser. No. 14/795,334 filed on Jul. 9, 2015, now issued as U.S. Pat. No. 9,602,267, which is a continuation of U.S. patent application Ser. No. 13/520,406 filed on Sep. 27, 2012, now issued as U.S. Pat. No. 9,137,685, which is a National Phase Entry of the International Application No. PCT/JP2011/000060 filed Jan. 7, 2011 which claims priority of Japanese Patent Application No. 2010-003332, filed Jan. 8, 2010, the contents of which are incorporated by reference in its entirety.

TECHNICAL FIELD

The present invention relates to a communication apparatus and a communication method for notifying other communication apparatuses of precoding information via a backhaul.

BACKGROUND ART

As a mobile communication system that succeeds an LTE (Long Term Evolution), standardization of an LTE-advanced in the 3GPP (Third Generation Partnership Project) has been reviewed. In the LTE-advanced, for the purpose of an improvement in a user throughput of UE (User Equipment) that is located at a cell edge, an improvement in a cell throughput, or the like, a review has been made with respect to a technology in which a plurality of transmission and reception points that are geographically distant from each other cooperate with each other and perform a MIMO (Multi-Input Multi-Output) transmission, which is called coordinated multi-point transmission and reception (CoMP), even in a downlink (DL) and an uplink (UL). The CoMP is classified into the following two technologies (A) and (B). Hereinafter, the user equipment is sometimes expressed by an UE.

(A) Joint Processing (JP)

In the joint processing, data transmitted to the UEs may be used at the plurality of CoMP transmission points, and is transmitted as a desired signal toward the UEs. In this way, large inter-cell interference (ICI) from neighbor cells is changed into a desired signal, and other-cell interference is reduced. In addition, as a sub-category of the joint processing, Joint Transmission (JT)/Dynamic Cell Selection (DCS) is defined.

(B) Coordinated Beamforming (CB) and Coordinated Scheduling (CS)

In the coordinated beamforming and the coordinated scheduling, data that is transmitted to the UEs may be used only by a serving cell, and is transmitted only from the serving cell. In addition, information such as a beamforming weight that is necessary for the coordinated scheduling and the coordinated beamforming is determined in a coordination manner among the plurality of transmission points. Therefore, the inter-cell interference may be effectively reduced or suppressed.

Both of the joint processing and the coordinated beamforming methods are effective technologies to realize high frequency usage efficiency.

As described above, in the LTE-advanced, an approach has been made with respect to a situation in which due to the coordinated MIMO transmission and reception technologies among the plurality of transmission and reception points (for example, NodeB), inter-cell interference is reduced and therefore the high frequency usage efficiency is realized. On the other hand, in Rel. 8 description of the LTE, a configuration is also defined to realize Inter-Cell Interference Coordination (ICIC). Hereinafter, a downlink (DL) transmission from a base station to the user equipment will be described.

In the DL transmission of the LTE Rel. 8, an RNTP (Relative Narrow band TX Power), which indicates information of future transmission signal power (normalized EPRE (Energy Per Resource Element)) in physical resource block (PRB) units, is defined as a binary indicator (0 or 1) (refer to Non-Patent Literature 3).

Here, 1 PRB is made up by 12 resource elements (RE), that is, 12 sub-carriers. Due to an inter-cell coordinated scheduling in which an indicator of future transmission signal power (RNTP) in other cells is used, the ICIC in a frequency domain may be realized. Hereinafter, the physical resource block is sometimes expressed simply by a PRB.

FIG. 22A shows a conceptual diagram of a case in which the indicator of the RNTP is shared between cells. In addition, FIG. 22(B) shows the indicator of the RNTP for each PRB in a frequency domain.

As shown in FIG. 22A, NodeB #0 (serving cell) notifies NodeB #1 (non-serving cell) of the indicator of the RNTP via a backhaul (for example, X2 interface). In addition, the NodeB #1 performs the coordinated scheduling of the frequency domain by using the indicator of the RNTP of the NodeB #0.

In addition, as shown in FIG. 22(B), the indicator of the RNTP is information of future transmission signal power for each PRB. In a case where a normalized EPRE (transmission signal power density) is smaller than any RNTP threshold value (that is, the transmission signal power is reduced in the future), the indicator of the RNTP shows "0". In addition, the upper limit of the normalized EPRE is not promised (no promise), the indicator of the RNTP shows "1".

That is, the NodeB #0 notifies the NodeB #1 of information of the transmission signal power for each PRB, for example, via the backhaul such as X2, and the NodeB that has received the information does not allocate the UE of a serving cell to the PRB showing the indicator of 1 and may perform the coordinated scheduling of the frequency domain, in which interference with neighbor cells is reduced. That is, the NodeB #0 may effectively realize an FFR (Fractional Frequency Reuse) by considering other-cell interference.

However, in the transmission system of LTE Rel. 8, an effect of reducing interference with other cells and a decrease in the frequency usage efficiency through the sharing of a band between cells are in a trade-off relationship, such that there is a problem in that an improvement effect of the throughput is not sufficient. Here, the "sharing of a band between cells" is equivalent to a case in which frequency repetition (reuse factor) is partially set to be more than 1 in the system band.

Therefore, as described above, in the LTE-advanced, a review has been made with respect to the inter-cell interference coordination (ICIC) on the same time-frequency, which uses a spatial domain (MIMO of a plurality of transmission and reception points that are geographically distant from each other). As a method of controlling interference between coordination cells by using the spatial domain, the following method has been reviewed (for example, refer to Non-Patent Literature 1 and Non-Patent Literature 2).

In a Single-User (SU)-MIMO in a single cell or a Multi-User (MU)-MIMO in the related art, when selecting a precoding matrix indicator (PMI), which is defined for precoding (beamforming) of a transmission signal, only a precoding (beamforming) in a serving cell to which user equipment of a serving cell is connected is taken into consideration. In addition, a method in which the user equipment selects a PMI that is capable of maximizing the throughput (that is, Best PMI) and feeds back the PMI to a serving cell has been adopted. On the other hand, in Non-Patent Literature 1 and Non-Patent Literature 2, on the basis of extended feedback information related to the PMI (beamforming weight) from the UE in which interference from other cells is taken into consideration, the PMI information (for example, a PMI restricting the use in neighbor cells, that is, worst PMI) is shared between coordination nodes. In addition, on the basis of the shared information, the coordinated beamforming (CB) is performed among the plurality of cells, and thereby the maximization of the throughput in the entirety of the plurality of cells is attempted. Hereinafter, specific means thereof will be illustrated with reference to FIG. 23. FIG. 23 shows a conceptual diagram in a case where the coordinated beamforming (CB) among the plurality of cells is performed on the basis of the PMI information.

(1) The UE receives a reference signal (RS) of other cells (and a serving cell) and determines a worst PMI list of other cells that generate large inter-cell interference (ICI) with itself. In addition, the UE feeds back the worst PMI list (worst PMI #0 and worst PMI #3 in the drawing) to the serving cell (refer to arrow (1) in FIG. 23).

(2) The NodeB #0 that is a serving-cell selects the worst PMI list on the basis of feedback information from a plurality of UEs that are connected to the serving cell, and notifies other nodes of the selected worst PMI list (refer to arrow (2)-2 in FIG. 23).

(3) Other nodes select a PMI other than the notified worst PMI and transmit it to the UE in the serving cell (connected to the node) in a precoding (beamforming) manner (refer to (3) in FIG. 23).

In this manner, interference with neighbor cells may be reduced while avoiding the decrease in frequency usage efficiency by sharing the band between the coordination cells (the number of frequency repetitions (reuse factor) is partially set to be more than 1 in the system band), which is a problem in the transmission system of LTE Rel. 8.

CITATION LIST

Non Patent Literature

Non-Patent Literature 1: R1-093780, Estimation of extended PMI feedback signaling required for user intra-cell and inter-cell coordination, 3GPP TSG RAN WG1 #58bis, Miyazaki, Japan, 12-16 Oct. 2009
Non-Patent Literature 2: R1-093781, Consideration on performance of coordinated beamforming with PMI feedback, 3GPP TSG RAN WG1 #58bis, Miyazaki, Japan, 12-16 Oct. 2009
Non-Patent Literature 3: 3GPP TS 36.213 V8.7.0 (2009-05)

SUMMARY OF INVENTION

Technical Problem

When the transmission system in Non-Patent Literature 1 and Non-Patent Literature 2 described above is extended to a frequency domain, inter-cell interference coordination (ICIC) of a frequency domain and a spatial domain may be easily assumed. For example, other nodes are notified of an extended PMI (beamforming weight) list for each sub-band that is made up by one PRB or a plurality of PRBs through a backhaul, other nodes that have received this information select a PMI other than the extended PMI (for example, worst PMI), which is notified for each PRB, and other nodes transmit the selected PMI toward UEs connected to the cells in a precoding (beamforming) manner. Here, the worst PMI is an example of the extended PMI, and is an indicator of the precoding weight that is not desired to use by adjacent nodes.

In this manner, an appropriate beamforming weight for each band may be selected between coordination nodes, and therefore the inter-cell interference coordination (ICIC) may be effectively reduced. FIG. 24 shows an example of a transmission system to effectively reduce the inter-cell interference coordination (ICIC). As shown in FIG. 24, on the basis of the extended PMI information (worst PMI information) that is fed back from a plurality of UEs that are connected to the NodeB #0, the NodeB #0 separately selects two worst PMI lists with respect to each of PRB #0 to PRB #4, and notifies the NodeB #1 of the selected lists. In this manner, the ICIC of the frequency domain and the spatial domain may be realized.

However, in a case where the transmission system in Non-Patent Literature 1 and Non-Patent Literature 2 is extended to a frequency domain, it is necessary for the NodeB #0 to notify other nodes of extended PMI list information for each frequency band, such that there is a problem in that overhead increases and therefore a traffic over the backhaul is made to be heavy. For example, in a case where a system band (20 MHz) is made up by 110 PRBs, and two PMIs are selected from sixteen ($=2^4$) kinds of PMIs (codebook) for each PRB and are notified, control information of 880 bits ((the number of PRBs=110)×(notified bit numbers of 1 PMI for each PRB=4 bits)×2=880 bits) is necessary for each node. Furthermore, in the LTE-advanced, review has been made with respect to a technology called carrier aggregation (spectrum aggregation) in which a plurality of bands that are made up of 20 MHz called a component carrier (CC) are collected (made to have a wide band) and a high-speed transmission is realized, such that in this case, the increase in overhead becomes a further significant problem.

Therefore, an object of the invention is to provide a communication apparatus and a communication method, which are capable of reducing overhead related to precoding information (for example, PMI) and beamforming weight information that are notified over a backhaul while maintaining an ICI reduction effect due to DL coordinated CoMP (CB, JP, or the like) among a plurality of nodes.

Solution to Problem

The present invention provides a communication apparatus including: a generator that generates frequency resource position information corresponding to first information which is based on communication quality information received from user equipments, the frequency resource position information indicating validity or invalidity of the first information for each frequency resource, and a transmitter that transmits the first information, the frequency resource position information and a cell ID which the frequency resource position is applied, to another communication apparatus via a backhaul.

The present invention also provides a communication method including: generating frequency resource position information corresponding to a first information which is based on communication quality information received from user equipments, the frequency resource position information indicating validity or invalidity of the first information for each frequency resource, and transmitting the first information, the frequency resource position information and a cell ID which the frequency resource position is applied, to another communication apparatus via a backhaul.

Advantageous Effects of Invention

According to the communication apparatus and the communication method related to the invention, it is possible to reduce overhead related to information that is notified over a backhaul while maintaining an ICI reduction effect due to DL coordinated CoMP (CB, JP, or the like) among a plurality of nodes.

BRIEF DESCRIPTION OF DRAWINGS

FIGS. 16A and 16B are examples of an extended PMI list according to a third embodiment.

FIG. 22A is a conceptual diagram in a case where the indicator of the RNTP is shared between cells, and FIG. 22B is an example of the indicator of the RNTP for each PRB in a frequency domain.

FIG. 23 is a conceptual diagram of a case in which coordinated beamforming is performed among a plurality of cells on the basis of the PMI information.

FIG. 24 is an example of a transmission system to effectively reduce inter-cell interference coordinated (ICIC).

MODES FOR CARRYING OUT INVENTION

Figure 1:
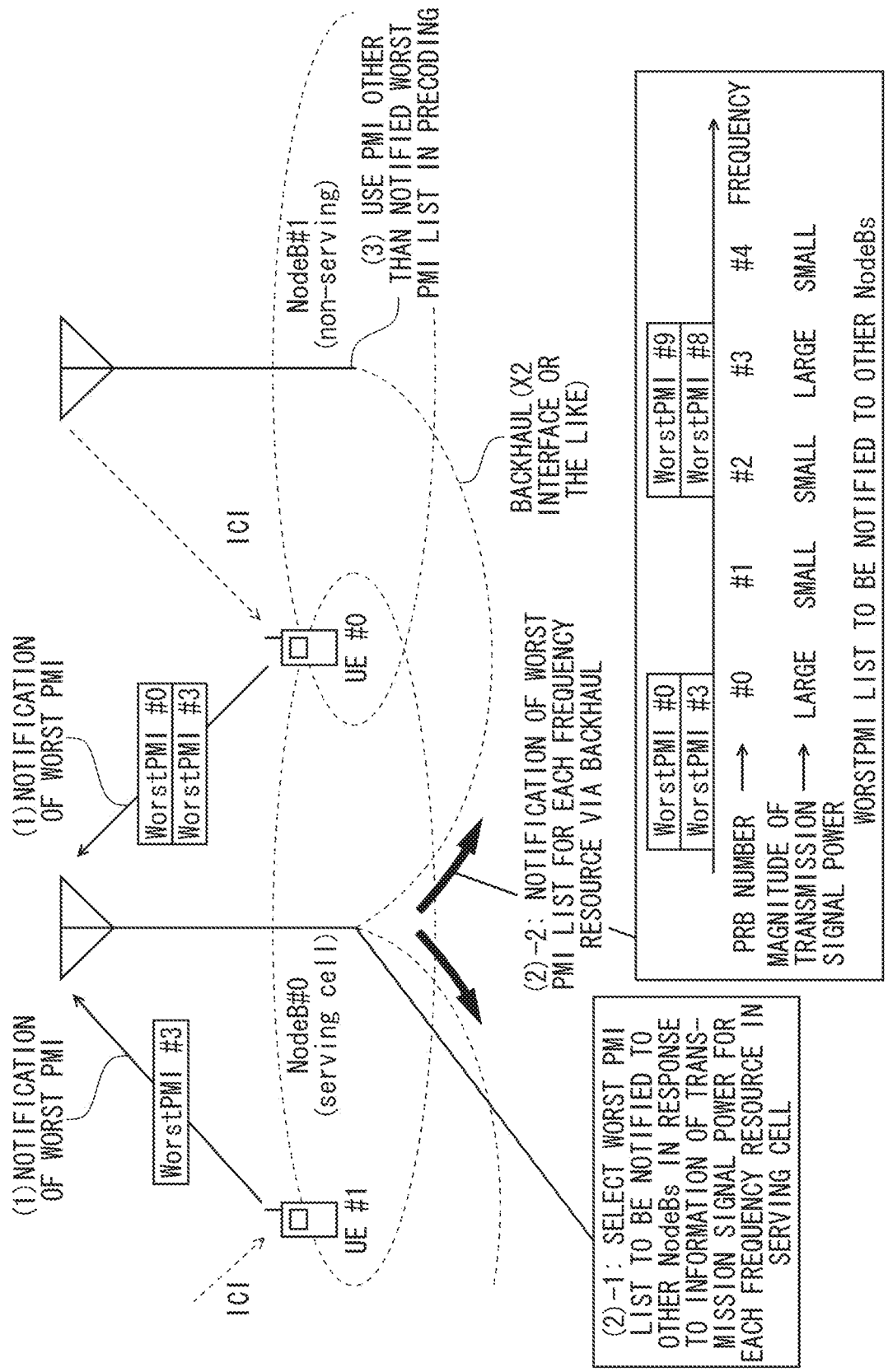
FIG. 1 is a conceptual diagram of a transmission system according to a first embodiment.

Hereinafter, embodiments of the invention will be described with reference to drawings.

Each of the embodiments of the invention is based on the following viewpoints.

(1) When based on a general cell design (area development of a node) to improve expansion of a coverage and a service quality by considering a reduction in installing cost of a node and usage efficiency thereof, among UEs that are uniformly present within a cell, a proportion of UEs that are present at a cell edge is at most substantially 10 to 20%. In addition, a transmission rate of the UE, which is present at the cell edge in which a radio channel quality is bad (a Signal-to-Interference plus Noise power Ratio (SINR) is low), is significantly lower than that of a UE that is present in the vicinity of the node. Therefore, an allocation of a frequency resource that is used by the UE that is present at the cell edge is at most substantially 10 to 20% within a system band. That is, a proportion of a frequency resource that needs extended beamforming (PMI) information for CoMP is also at most substantially 10 to 20% within the system band. In other words, in regard to resources of substantially 80 to 90% of the system band, it is not necessary for the extended beamforming (PMI) information that is necessary for the CoMP to be shared between nodes. Therefore, an amount of the extended beamforming (PMI) information is variably controlled in response to a resource position within the system band, which allocates the UE that is present at the cell edge, and is notified to other nodes.

(2) Since a main target of the coordinated beamforming between cells is UEs that are present at the cell edge, the PMI information to be notified to other nodes is sufficient only with extended PMI information of other cells in a frequency resource to be allocated to the cell edge UE of the serving cell. Therefore, only the coordinated PMI (beamforming weight) information in a specific resource (at minimum), which other nodes need for the ICIC, is selected and is notified to other nodes.

(3) The frequency resource to be allocated to the UE that is present at the cell edge (or in the vicinity of the cell edge) of the serving cell is considered to be expressed by the information (for example, 1 (or 0) information of the RNTP) of the transmission signal power of the serving cell. That is, when the indicator of the RNTP is 0 (or 1), since the transmission power is small (or large), the frequency resource may be estimated to be used by the UE that is present in the vicinity of the cell (at the edge). In other words, the frequency resource (frequency resource that allocates the cell edge UE in the serving cell) of the coordinated beamforming, which other cells need, may be estimated only with the serving node without needing notified information from other nodes. Therefore, each node may autonomously select the coordinated PMI (beamforming weight) information in the specific resource (at minimum) which other nodes need for the ICIC.

From the above-described viewpoints of (1) to (3), as one characteristic of each embodiment of the invention, each node autonomously selects (only with the serving node) only useful minimum PMI information (of specific frequency resource), which other nodes need for the ICIC, from the transmission signal power in the serving cell (in LTE Rel. 8, information (an indicator of the RNTP) of future transmission signal power or a communication quality, and notifies other nodes of the selected information via a backhaul. In this manner, the minimum and useful information may be shared between nodes for inter-cell coordination in an autonomously dispersed manner while reusing a format of Rel. 8 (that is, maintaining a backward compatibility), such that due to optimization of the beamforming information in an entire system (among a plurality of cells), the throughput in the plurality of cells may be improved.

First Embodiment

A first embodiment will be described in detail. This embodiment has the following characteristics (a) to (c).

(a) An amount of precoding (beamforming) information (for example, the number of PMI lists) that is to be notified to other nodes via the backhaul is variably controlled in response to a resource position of a frequency domain, and this information and information of a selected frequency resource position are notified to other nodes.

(b) Information of a magnitude of future transmission power (density), a magnitude of (normalized) transmission signal energy (density), or good or bad of a communication quality for each frequency resource in the serving cell, and the amount of the precoding (beamforming) information (for example, the number of PMI lists) at the frequency resource position are correlated with each other.

(c) As the future transmission power (density) or (normalized) transmission signal energy (density) for each frequency resource in the serving cell is large (or small), or as the communication quality becomes better (or worse) for each frequency resource in the serving cell, the amount of precoding (beamforming) information (for example, the number of PMI lists) at a corresponding resource is made to increase (or decrease).

Figure 2:
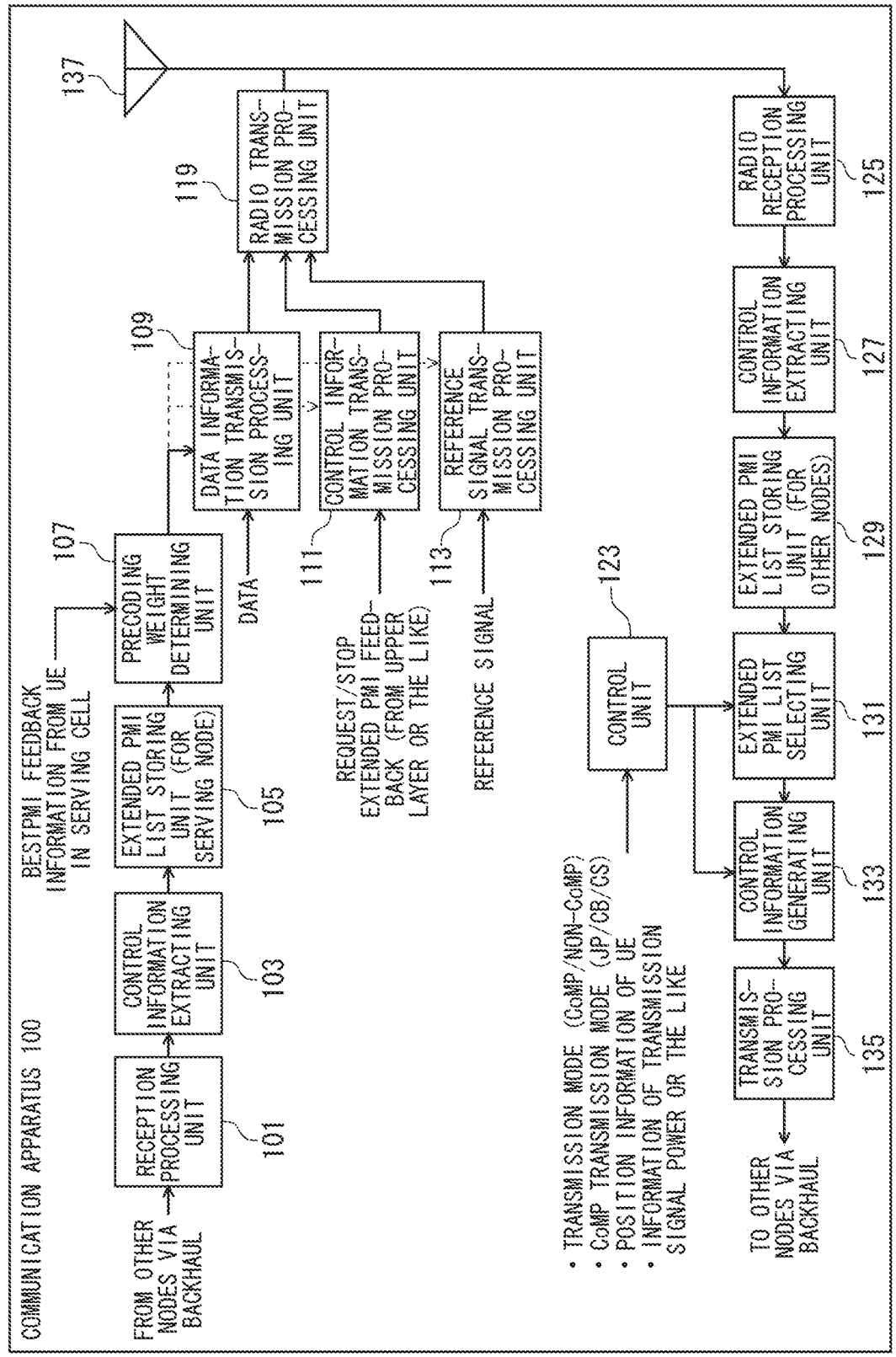
FIG. 2 is a block diagram illustrating a configuration of a communication apparatus 100 in the transmission system according to the first embodiment.
Figure 3:
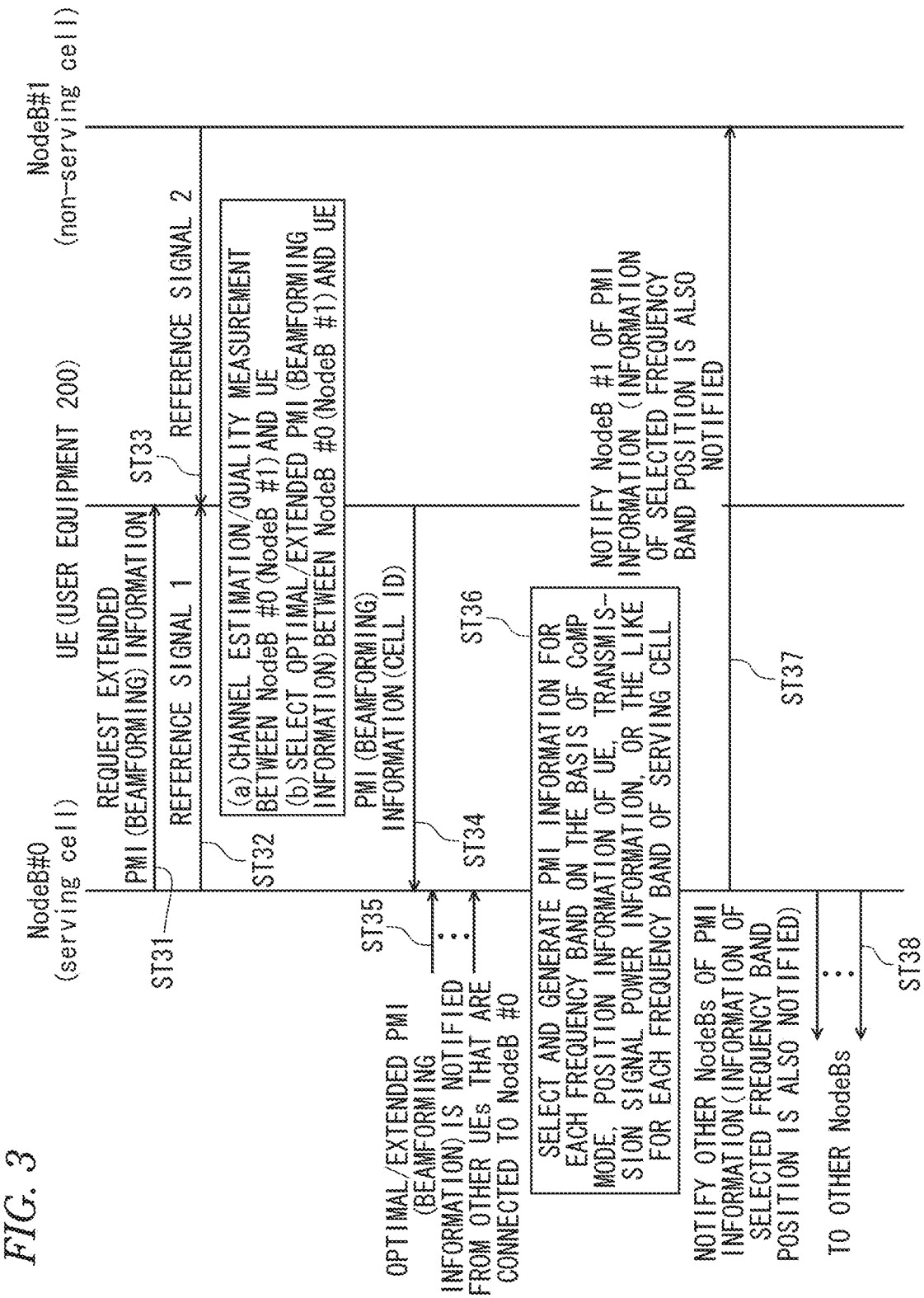
FIG. 3 is a flowchart illustrating a control sequence in the transmission system shown in FIG. 2.

FIG. 1 shows a conceptual diagram of a transmission system according to the first embodiment. FIG. 2 shows a block diagram of a communication apparatus (base station (NodeB)) 100 in the transmission system according to this embodiment. In addition, FIG. 3 shows a diagram illustrating a control sequence in the transmission system shown in FIG. 1.

In the transmission system shown in FIG. 1, a NodeB #0 (a serving cell) selects an amount of precoding (beamforming) information (for example, the number of worst PMI lists), which is notified to other nodes, in response to information of transmission signal power for each frequency resource in the serving cell ((2)-1 in the drawing), and notifies NodeB #1 (non-serving cell) that is another node of the amount of the precoding (beamforming) information for each frequency resource via a backhaul (for example, an X2 interface). In this manner, the NodeB #0 (serving cell) performs the ICIC of a frequency domain and a spatial domain.

In FIG. 1, as an amount of precoding (beamforming) information for each frequency band, a worst PMI list is shown. For example, in a physical resource block (PRB) number of #0, since transmission signal power is large, two worst PMI #0 and worst PMI #3 are shown in the worst PMI list.

The communication apparatus (base station (NodeB)) 100 shown in FIG. 2 includes a reception processing unit 101, a control information extracting unit 103, an extended PMI list storing unit (for a serving node) 105, a precoding weight determining unit 107, a data information transmission processing unit 109, a control information transmission processing unit 111, a reference signal transmission processing unit 113, a radio transmission processing unit 119, a radio reception processing unit 125, a control information extracting unit 127, an extended PMI list storing unit (for other nodes) 129, an extended PMI list selecting unit 131, a control information generating unit 133, a transmission processing unit 135, and a transmission and reception antenna 137. Hereinafter, in this embodiment, it is assumed that the communication apparatus 100 is located in the NodeB #0 (serving cell).

<Operation of NodeB #0>

The NodeB #0 (serving cell) receives an extended PMI feedback request signal from an upper layer, and inputs this information to the control information transmission processing unit 111. It is assumed that this extended PMI (beamforming) request is notified, for example, with signaling of a higher layer.

The control information transmission processing unit 111 converts the extended PMI feedback request signal into a binary bit sequence, performs a predetermined transmission signal processing such as channel encoding and modulation, and outputs the resultant signal to the radio transmission processing unit 119.

In addition, the reference signal transmission processing unit 113 performs a predetermined transmission signal processing according to a reference signal transmitting request, and outputs the generated reference signal to the radio transmission processing unit 119. As a kind of reference signal, CRS (Cell Specific Reference Signal), CSI-RS (Channel State Information Reference Signal), DMRS (De-Modulation Reference Signal), and US-RS (User Specific Reference Signal) may be exemplified.

The radio transmission processing unit 119 performs a radio transmission processing such as D/A conversion, amplification, and up-conversion with respect to a signal input from the control information transmission processing unit 111, and transmits the signal subjected to the radio transmission processing toward a UE as an extended PMI (beamforming) request signal via the transmission and reception antenna 137. In addition, the radio transmission processing unit 119 performs the same processing with respect to a reference signal input from the reference signal transmission processing unit 113 and transmits the processed reference signal via the transmission and reception antenna 137.

<Operation of UE>

Here, an operation of user equipment (UE) 200 that is connected to the NodeB #0 will be described. Hereinafter, the user equipment 200 is sometimes simply written as a UE. In addition, in a case where a plurality of UEs, which are the items of user equipment 200, are present, the UEs are sometimes written as UE #0, UE #1, UE #2, and the like for distinguishing the plurality of UEs.

The UE receives the extended PMI (beamforming) request signal for a serving UE, which is transmitted from the NodeB #0. In addition, the UE receives a reference signal (RS) of a serving cell (serving cell) and a reference signal (RS) of other cells (non-serving cells).

In addition, the UE performs channel estimation/quality measurement between the NodeB #0 (serving cell) and the serving UE and channel estimation/quality measurement between the NodeB #1 (non-serving cell) and the serving UE from the received reference signals (RSs) of the serving cell (serving cell) and other cells (non-serving cells), and selects an extended PMI (for example, worst PMI list) of other cells, which generates large inter-cell interference (ICI) with the serving UE or reduces a reception SINR (Signal-to-Interference plus Noise Ratio) by using the channel estimation result/measurement result. Here, the PMI is defined between the NodeB and the UE in advance, and it is assumed that the NodeB and the UE share this information.

In addition, the UE may perform channel estimation/quality measurement between the NodeB #0 and the serving UE, and may additionally select an optimal PMI (for example, best PMI) between the NodeB #0 and the serving UE by using the channel estimation result/measurement result between the NodeB #0 and the serving UE. In addition, the UE may simultaneously identify a cell ID of another cell, which corresponds to the selected extended PMI, for example, from the CRS of other cells, or the like.

Next, the UE feedback-transmits the selected extended PMI (worst PMI list) to the NodeB #0 (serving cell) as a control signal according to a predetermined transmission processing sequence such as a modulation processing. In addition, the UE may additionally feed back the optimal PMI (best PMI) in the serving cell. (At this time, the UE may feed back a cell ID of another cell, which corresponds to the identified extended PMI, together with the extended PMI information. Therefore, the NodeB #0 (serving cell), which is a feedback destination, may recognize which cell (node) generates other-cell interference with which UE. Therefore, this may be used for frequency scheduling (allocation of a plurality of UEs to a frequency resource) within the NodeB #0 (serving cell), such that a multi-user diversity based on the frequency resource allocation within the NodeB #0 (serving cell) may be improved and thereby a cell throughput may be improved.). In addition, the optimal PMI (for example, best PMI) between the NodeB #0 and the serving UE may be additionally selected.

The NodeB #0 receives a control signal related to the extended PMI (worst PMI list) that is transmitted from a plurality of UEs in the serving cell (and the identified cell ID corresponding to the extended PMI) via the transmission and reception antenna 137, and inputs the control signal to the radio reception processing unit 125.

The radio reception processing unit 125 performs a reception processing such as down-conversion and A/D conversion, and demodulates and decodes the control signal to which the reception processing has been performed. In addition, the radio reception processing unit 125 outputs the demodulated and decoded control signal to the control information extracting unit 127.

The control information extracting unit 127 extracts the extended PMI information (and the cell ID) that are included in the control signal input from the radio reception processing unit 125, and outputs the extracted extended PMI information to the extended PMI list storing unit (for other nodes) 129.

The extended PMI list storing unit (for other nodes) 129 generates an extended PMI list that is fed back from the plurality of UEs in the serving cell for each frequency resource (for example, in PRB units). For example, the extended PMI list storing unit 129 generates an extended PMI (worst PMI list) that is expected not to be used by other cells (whose use is restricted, prohibited, and not encouraged). For example, to reduce other-cell interference from the NodeB #1 (non-serving cell) that is a neighbor cell of the NodeB #0 to the NodeB #0 (serving cell), the extended PMI list storing unit 129 generates an extended PMI list in frequency resource (PRB) units, in which use in the neighbor cell NodeB #1 is restricted (prohibited, and not encouraged) (refer to FIG. 4).

Figure 4:
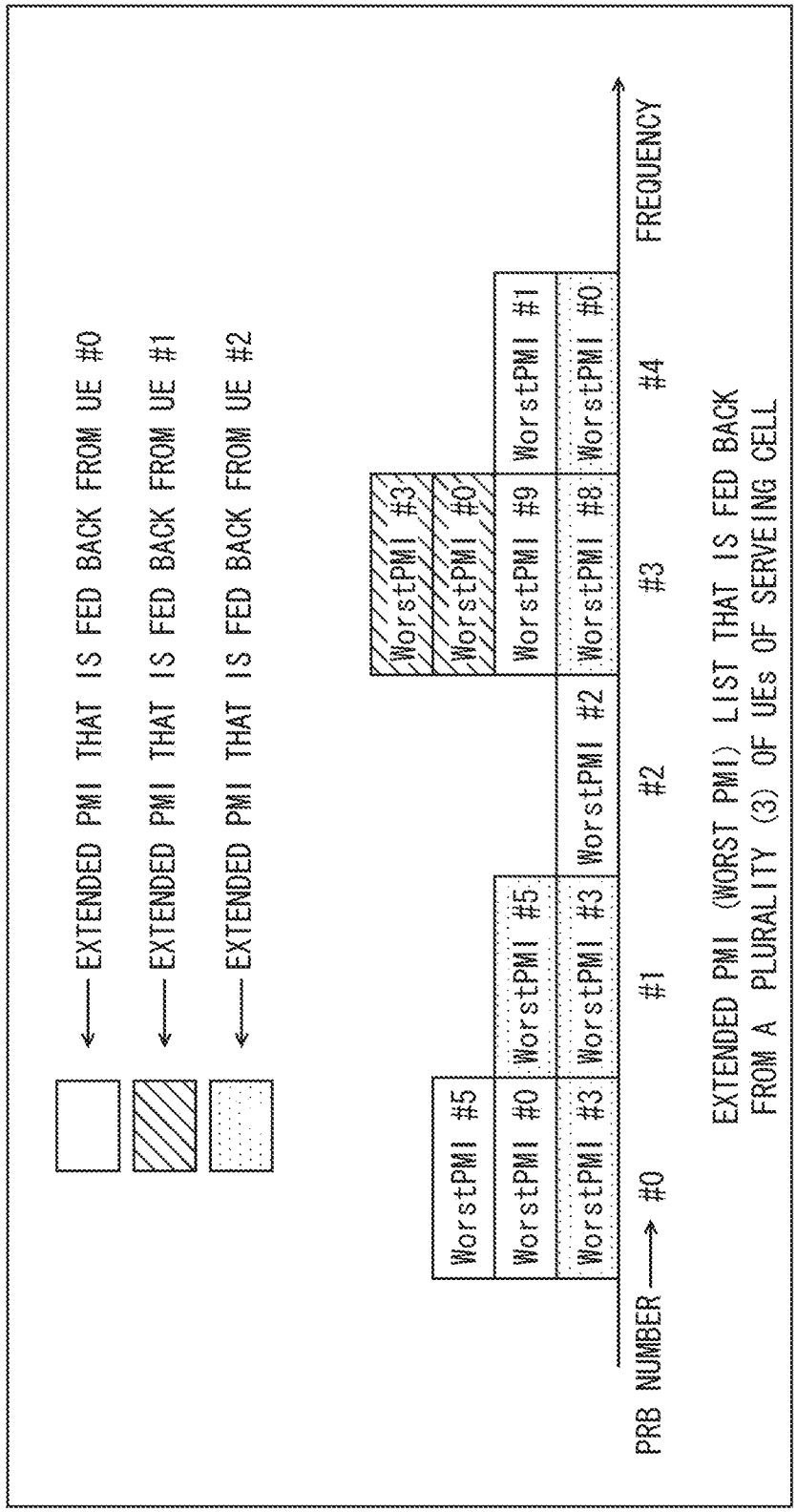
FIG. 4 is an example of an extended PMI list according to the first embodiment.

FIG. 4 shows an example of the extended PMI list according to the first embodiment. The horizontal axis represents a frequency. As shown in FIG. 4, for example, in a physical resource (PRB) number #0, worst PMI #0 and worst PMI #5 as a PMI fed back from the UE #0 in the serving cell and worst PMI #3 as a PMI fed back from the UE #2 in the serving cell are present. In addition, as shown in FIG. 4, for example, in the physical resource (PRB) number #3, worst PMI #9 as a PMI fed back from the UE #0 in the serving cell, worst PMI #0 and worst PMI #3 as a PMI fed back from the UE #1 in the serving cell, and worst PMI #8 as a PMI fed back from the UE #2 in the serving cell are present.

In addition, the extended PMI list shown in FIG. 4 may be individually generated for each of other cells on the basis of the cell ID that is fed back together with the extended PMI, or may be generated with one list by collecting a plurality of cells among other cells other than the serving cell. In the case of creating one list by collecting the plurality of cells among other cells other than the serving cell, complexity and computation of the NodeB #0 may be reduced.

In addition, the extended PMI list storing unit (for other nodes) 129 outputs the generated extended PMI list to the extended PMI list selecting unit 131.

A control unit 123 determines a position of a specific frequency resource and the number of notification PMIs (amount of precoding and beamforming information) at the resource, which are selected as PMI information to be notified to other nodes via the backhaul, from a transmission mode (transmission mode of CoMP, JP/CB/CS, or the like) for each frequency resource, position information of the UE, information of the transmission signal power for each frequency resource, or the like, and outputs the determined position and the determined number of PMIs to the extended PMI list selecting unit 131 and the control information generating unit 133.

The extended PMI list selecting unit 131 selects the extended PMI list (amount of precoding (beamforming) information) for each frequency resource, which is input from the extended PMI list storing unit (for other nodes) 129, on the basis of the specific frequency resource position and the number of notification PMIs (amount of precoding and beamforming information) in the resource, which are selected as the PMI information to be notified to other nodes via the backhaul and which are input from the control unit 123.

Figure 5:
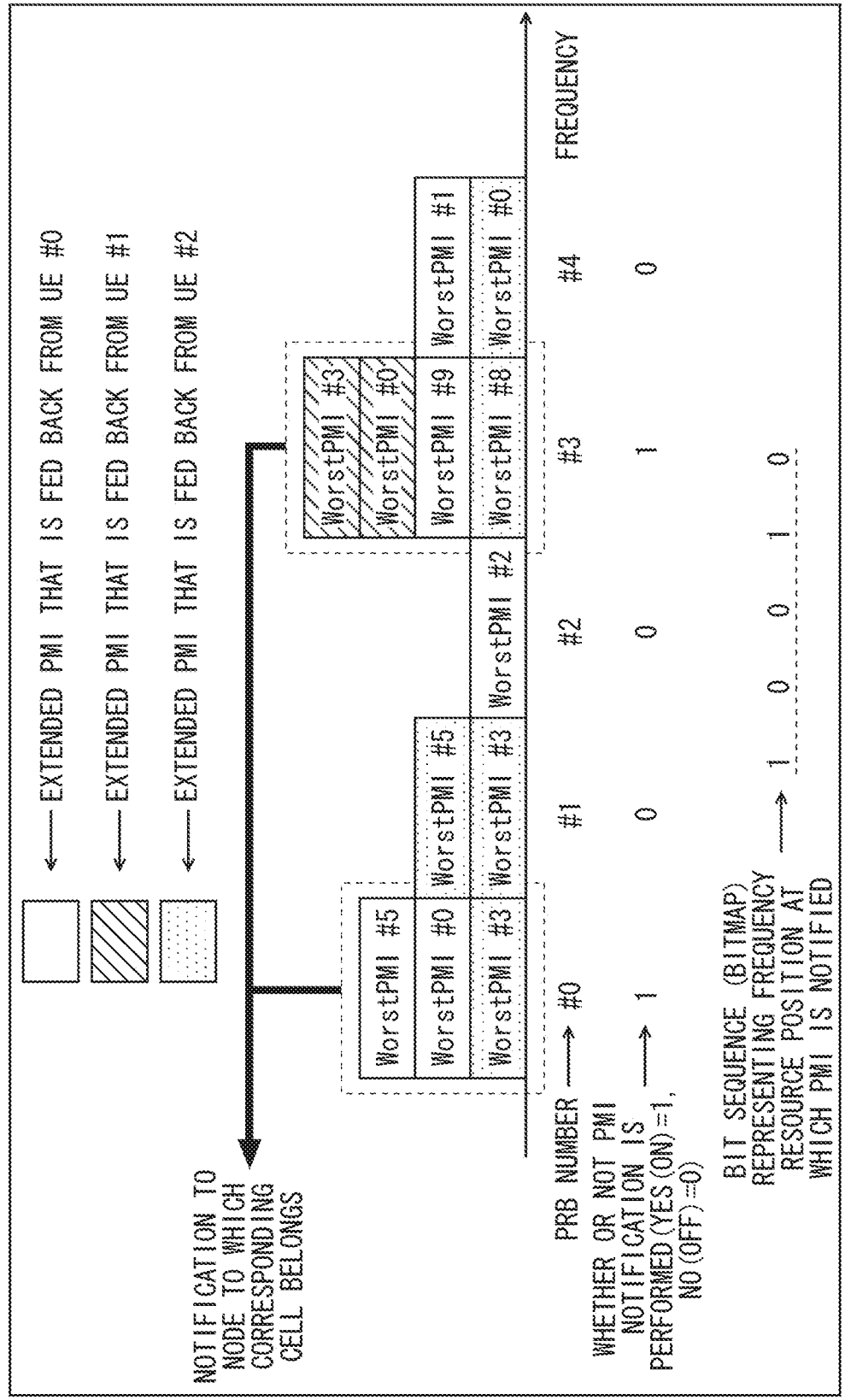
FIG. 5 is an example of an extended PMI list selected by an extended PMI list selecting unit 131.

Here, an example of the extended PMI list for each frequency resource, which is selected by the extended PMI list selecting unit 131, is shown in FIG. 5. As shown in FIG. 5, for example, in regard to a physical resource block (PRB) number #0, worst PMI #5 and worst PMI #0 that are fed back from the UE #0, and worst PMI #3 that is fed back from the UE #2 are selected. In addition, in regard to PRB #3, worst PMI #9 that is fed back from the UE #0, worst PMI #8 that is fed back from the UE #2, and worst PMI #3 and worst PMI #0 that are fed back from the UE #1 are selected.

In addition, the extended PMI list selecting unit 131 outputs the notification PMI list shown in FIG. 5, which is variably selected for each frequency resource, to the control information generating unit 133 so as to notify a node to which a corresponding cell belongs of the notification PMI list. In addition, in the case of the example shown in FIG. 5, the extended PMI lists of the PRB number #0 and PRB #3 are output.

In addition, in a case where in the extended PMI list storing unit (for other nodes) 129, the extended PMI list for each frequency resource is generated for each cell ID, the notification extended PMI list, which is selected for each cell, is output to the control information generating unit 133 together with the cell ID. In addition, in a case where in the extended PMI list storing unit (for other nodes) 129, the extended PMI list for each frequency resource is generated for each cell group in which a plurality of cell IDs are collected, the extended PMI list is output to the control information generating unit 133 together with the corresponding plurality of cell ID or a cell group ID of the group.

The control information generating unit 133 generates control information by performing a process of converting the extended PMI list (and the cell ID and cell group ID) that is input from the extended PMI list selecting unit 131 and the notification frequency resource position that is input from the control unit 123 into a binary sequence, or the like, and outputs the generated control information to the transmission processing unit 135. As a method of expressing the notification frequency resource position, for example, whether or not the extended PMI list is present for each frequency resource may be expressed as ON(=1)/OFF (=0) of a bitmap. That is, in a frequency resource in which the PMI list to be notified is present, the position is expressed as 1 (ON), and in a frequency resource in which the PMI list to be notified is not present, the position is expressed as 0 (OFF). In FIG. 5, since the PMI list to be notified is present in the positions of frequency resources of PRB #0 and PRB #3, the positions are expressed as 1, and since the PMI list to be notified is not present in the other positions (PRB #1, PRB #2, and PRB #4) of the frequency resources, the positions are expressed as 0.

After adding a header representing a destination address of a transmission node (cell), or the like with respect to the extended PMI list (and cell ID and group cell ID) and the notification frequency resource number that are input with reference to the information of the cell ID (or the group cell ID), the transmission processing unit 135 performs a predetermined processing to generate a transmission signal over the backhaul and transmits this signal to other nodes (cells).

The reception processing unit 101 receives control information related to the extended PMI list (and the cell ID and group cell ID) and the notification frequency resource number that are transmitted from other nodes (cells), performs a predetermined processing such as confirmation of the destination address or the like, and then outputs the control information to the control information extracting unit 103.

The control information extracting unit 103 extracts the extended PMI list (and the cell ID and group cell ID) and the notification frequency resource number, which are included in the control signal and are transmitted from other nodes (cells), and outputs them to the extended PMI list storing unit (for a serving node) 105.

The extended PMI list storing unit (for a serving node) 105 generates the extended PMI list for each of other cells or for each cell group, and for each frequency resource, and outputs this information to the precoding weight determining unit 107.

The precoding weight determining unit 107 determines, for example, a precoding weight for each frequency resource that maximizes the cell throughput or a precoding weight for each UE within a serving cell on the basis of the best PMI feedback information for each frequency resource, which is input from the UE of the serving cell, the extended PMI list (for example, worst PMI list) for each frequency resource of other cells (or for each cell group), which is input from the extended PMI list storing unit (for a serving node) 105, or the like. In addition, the determined weight information is output to the data information transmission processing unit 109, the control information transmission processing unit 111, or the reference signal transmission processing unit 113.

The data information transmission processing unit 109 performs a predetermined processing such as channel encoding and modulation with respect to the input data signal for the UE, and then performs precoding with respect to a transmission data signal on the basis of the weight information input from the precoding weight determining unit 107. Then, the data information transmission processing unit 109 outputs the pre-coded data signal to the radio transmission processing unit 119.

In addition, the control information transmission processing unit 111 and the reference signal transmission processing unit 113 may perform precoding with respect to a control signal and a reference signal (particularly, DMRS) on the basis of the precoding weight information input from the precoding weight determining unit 107.

Here, a control sequence in the transmission system shown in FIG. 1 will be described with reference to FIG. 3. FIG. 3 shows a diagram illustrating a control sequence in the transmission system shown in FIG. 1.

In step ST31, the NodeB #0 (serving cell) transmits an extended PMI (beamforming) request signal toward a UE.

In steps ST32 and ST33, the UE receives a reference signal of the NodeB #0 that is a serving cell, and a reference signal of the NodeB #1 (non-serving cell) that is another cell.

In step ST34, the UE feedback-transmits the extended PMI information (corresponding cell ID and optimal PMI) to the NodeB #0 as a control signal.

In step ST35, the NodeB #0 receives the PMI information from other UEs that are connected to the serving cell.

In step ST36, the NodeB #0 selects and generates PMI information for each frequency band in response to a CoMP mode for each frequency band of the serving cell, position information of the UE, transmission signal power information, or the like.

In step ST37, the NodeB #0 notifies the NodeB #1 of the PMI information and information of the selected frequency band position.

In step ST38, the NodeB #0 notifies other NodeBs of the PMI information and the information of the selected frequency band position.

As described above, according to the transmission system related to this embodiment, the communication apparatus 100 autonomously selects and notifies only necessary minimum precoding (beamforming) information of the UE that performs the CoMP among the plurality of cells in a specific frequency resource in response to the transmission signal power information or the like, such that it is possible to reduce overhead related to precoding (beamforming weight (for example, the number of PMI lists)) information that is notified over the backhaul while maintaining the ICI reduction effect due to DL coordinated CoMP (CB, JP, or the like) among a plurality of nodes.

In addition, according to the transmission system related to this embodiment, since the communication apparatus 100 performs notification of only the precoding (beamforming) information with respect to a UE that is present at the cell edge, the overhead is reduced, and the degree of freedom of the scheduling in a frequency domain and a spatial domain among a plurality of cells, that is, a multi-user diversity effect among the plurality of cells, which are based on the allocation of the UE with respect to the frequency resource and the spatial resource among the plurality of cells, may be also maintained.

Here, an effect of the transmission system related to this embodiment will be described with respect to, for example, a case of the following three conditions.

(1) All of UEs, which are present at the cell edge in a proportion of substantially 10% within the cell, perform the CoMP, and the UEs occupy the frequency resource of substantially 10% of the system band.

(2) One PMI is expressed with 4 bits, and the number of notification PMIs for each PRB are two.

(3) The position information of the frequency resource at which the PMI is notified is expressed as a bitmap using 110 bytes. For example, the position information is notified in a state in which the frequency resource at which the PMI is notified is defined to indicate 1 and the frequency resource at which the PMI is not notified is defined to indicate 0.

In the case of the above-described conditions of (1) to (3), in the transmission system according to this embodiment, the number of total bits of the PMI to be notified to other nodes and the frequency resource position information of the selected PMI is 198 bits, which is the sum of 88 bits (=(110×0.1)×4×2)) that is the number of total notification bits of the PMI and 110 bits that is the number of bits of the frequency resource position information of the selected PMI. Therefore, it can be understood that the overhead may be greatly reduced compared to the technology in which a transmission system in Non-Patent Literature 1 and Non-Patent Literature 2 is extended to the frequency domain that was illustrated with reference to FIG. 24.

That is, when using a viewpoint in which a proportion of the number of UEs that are objects of the CoMP is greatly smaller than the number of total UEs (or, the number of UEs that are not objects of the CoMP) in the cell, even when "the frequency resource position information of the selected PMI" is notified in addition to "the selected PMI information", the total overhead may be greatly reduced compared to the technology in which the transmission system in Non-Patent Literature 1 and Non-Patent Literature 2 is extended to the frequency domain (method in which only the PMI information in the total frequency resources is notified), which was described with reference to FIG. 24.

First Modification Example

In a first modification example according to the first embodiment, a communication apparatus 100A is characterized in that information of a magnitude of transmission power (density) or (normalized) transmission signal energy (density), or information of good or bad of a communication quality for each frequency resource in the serving cell, and an amount of precoding (beamforming) information (for example, the number of PMI lists) at the frequency resource position are correlated with each other. In addition, the conceptual diagram of the transmission system according to the first embodiment shown in FIG. 1 may be also applied to this modification example.

Figure 6:
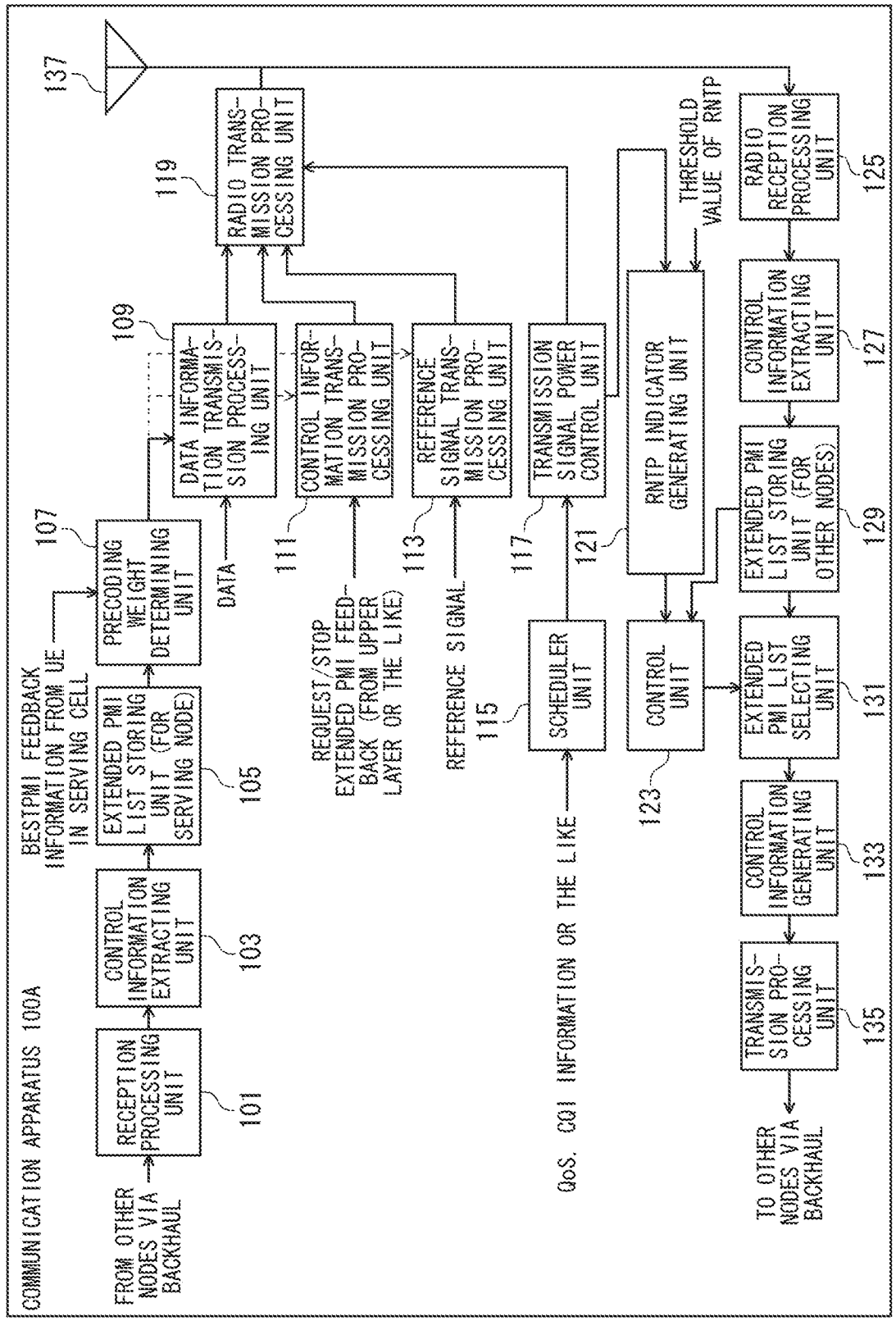
FIG. 6 is a block diagram illustrating a configuration of a communication apparatus 100A according to a first modification example of the first embodiment.

FIG. 6 shows a block diagram illustrating a configuration of the communication apparatus 100A according to the first modification example.

The communication apparatus (base station (NodeB)) 100A shown in FIG. 6 includes a reception processing unit 101, a control information extracting unit 103, an extended PMI list storing unit (for a serving node) 105, a precoding weight determining unit 107, a data information transmission processing unit 109, a control information transmission processing unit 111, a reference signal transmission processing unit 113, a scheduler unit 115, a transmission signal power control unit 117, a radio transmission processing unit 119, a unit 121 that generates a transmission power (RNTP) indicator for each frequency resource, a control unit 123, a radio reception processing unit 125, a control information extracting unit 127, an extended PMI list storing unit (for other nodes) 129, an extended PMI list selecting unit 131, a control information generating unit 133, a transmission processing unit 135, and a transmission and reception antenna 137. Hereinafter, in this embodiment, it is assumed that the communication apparatus 100A is located in the NodeB #0 (serving cell).

The communication apparatus 100A shown in FIG. 6 is different from the communication apparatus 100 shown in FIG. 2 in that the scheduler unit 115, the transmission signal power control unit 117, and the indicator generating unit 121 are provided. Hereinafter, the same reference numbers are given to the same components as the communication apparatus 100 shown in FIG. 2, and a detailed description thereof will not be repeated.

The scheduler unit 115 determines a frequency resource allocation of a UE in a serving cell and a transmission signal power value for each frequency resource on the basis of QoS (Quality of Service) that is input or CQI (Channel Quality Indicator) that is fed back from a UE. In addition, the scheduler unit 115 outputs this information to the transmission signal power control unit 117.

The transmission signal power control unit 117 generates a control signal to control an amplifier in the radio transmission processing unit 119 on the basis of the transmission signal power value for each input frequency resource, and outputs the control signal to the radio transmission processing unit 119 and the RNTP indicator generating unit 121.

The RNTP indicator generating unit 121 generates information (RNTP indicator) about a magnitude of a future (for example, after 1 frame) transmission signal power on the basis of the control signal and a threshold value of the RNTP that are input from the transmission signal power control unit 117, and outputs the generated information to the control unit 123.

The control unit 123 compares the extended PMI list that is generated for each frequency resource input from the extended PMI list storing unit (for other nodes) 129, and the information of the magnitude of the transmission signal power (density) (information of RNTP indicator) for each frequency resource in the serving cell or the like in correlation with each other. In addition, the control unit 123 selects the extended PMI list of the frequency resource on the basis of the information of the magnitude of the transmission signal power (density) (information of RNTP indicator) for each frequency resource.

Figure 7:
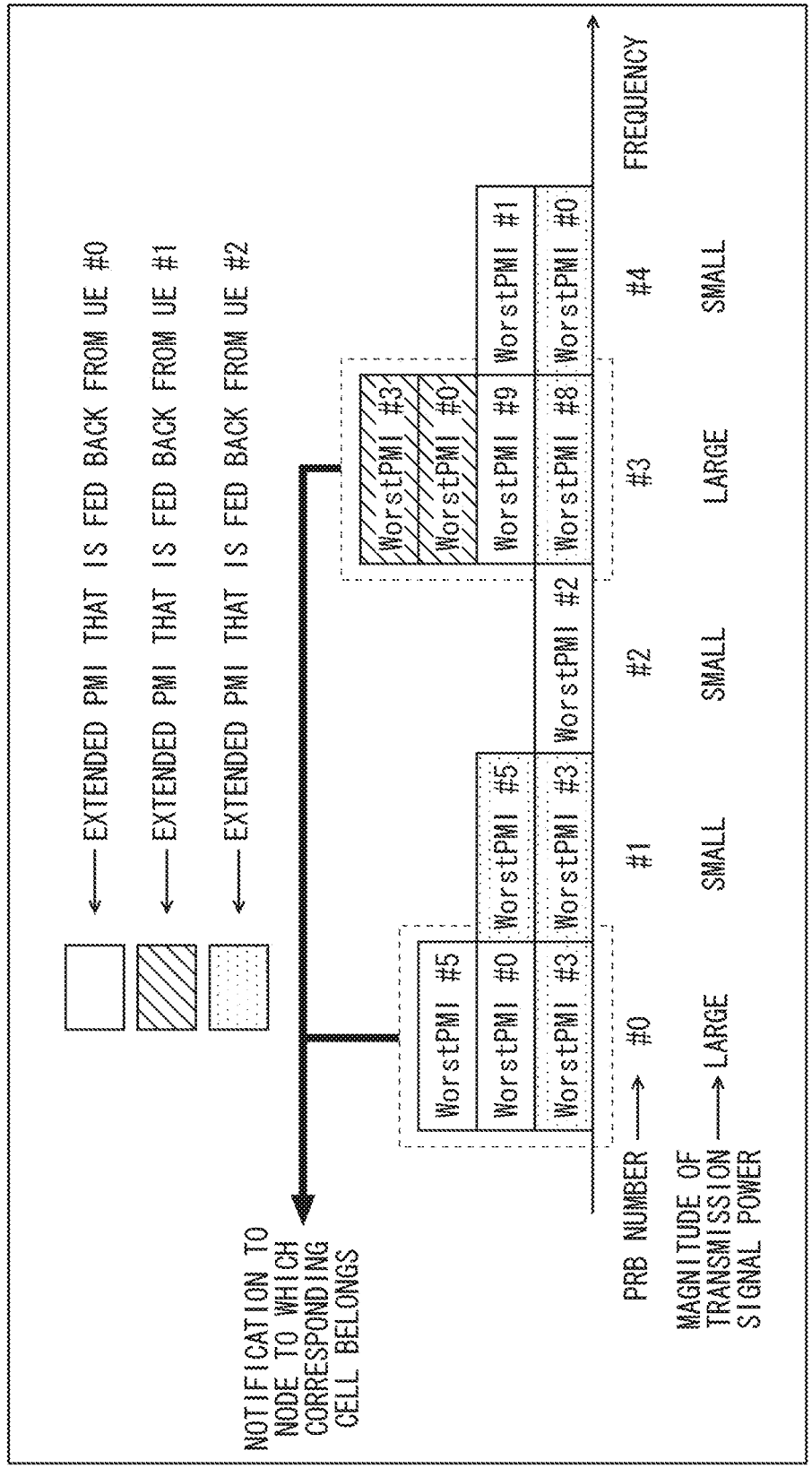
FIG. 7 is an example of an extended PMI list according to the first modification example.

FIG. 7 shows an example of the extended PMI list in the first modification example. In FIG. 7, the information of the magnitude of the (future) transmission signal power for each frequency resource is correlated with the extended PMI (worst PMI) list that is selected by the control unit 123. As shown in FIG. 7, since a UE that is present at a cell edge is to be allocated to physical resource block (PRB) numbers of #0 and #3 in the future (for example, after one frame), the transmission signal power of the frequency resource is set to be high. Therefore, the number of the frequency resource position is output to the extended PMI list selecting unit 131.

The extended PMI list selecting unit 131 selects the extended PMI list (in the case of extended PMI list shown in FIG. 7, extended PMI lists of PRB number #0 and PRB number #3) of the frequency resource position, which is notified from the control unit 123, and outputs the selected extended PMI list to the control information generating unit 133. As described above, the information of the selected frequency resource position (for example, a bit sequence (bitmap) representing frequency resource position at which the PMI is notified, which is shown in FIG. 5) may be also output to the control information generating unit 133.

The control information generating unit 133 generates control information by performing a process of converting the extended PMI list (and the cell ID and group cell ID) input from the extended PMI list selecting unit 131 and the notification frequency resource number that is input from the control unit 123 into a binary sequence, or the like, and outputs the generated control information to the transmission processing unit 135.

After adding a header representing a destination address of a transmission node (cell) or the like with respect to the extended PMI list (and cell ID and group cell ID) and the notification frequency resource number that are input with reference to the information of the cell ID, the transmission processing unit 135 performs a predetermined processing to generate a transmission signal over the backhaul and transmits this signal to other nodes (cells).

The reception processing unit 101 receives control information related to the extended PMI list (and the cell ID and group cell ID) and the notification frequency resource number that are transmitted from other nodes (cells), performs a predetermined processing such as confirmation of the destination address or the like, and then outputs the control information to the control information extracting unit 103.

The control information extracting unit 103 extracts the extended PMI list (and the cell ID and group cell ID) and the notification frequency resource number that are included in the control signal and are transmitted from other nodes (cells), and outputs them to the extended PMI list storing unit (for a serving node) 105.

The extended PMI list storing unit (for a serving node) 105 generates the extended PMI list for each of other cells or for each cell group, and for each frequency resource, and outputs this information to the precoding weight determining unit 107.

The precoding weight determining unit 107 determines, for example, a precoding weight for each frequency resource that maximizes the cell throughput or a precoding weight for each UE within a serving cell on the basis of the best PMI feedback information for each frequency resource, which is input from the UE of the serving cell, the extended PMI list for each frequency resource of other cells (or for each cell group), which is input from the extended PMI list storing unit (for a serving node) 105. In addition, the determined weight information is output to the data information transmission processing unit 109, the control information transmission processing unit 111, or the reference signal transmission processing unit 113.

The data information transmission processing unit 109 performs a predetermined processing such as channel encoding and modulation with respect to the input data signal for the UE, and then performs precoding with respect to a transmission data signal on the basis of the weight information input from the precoding weight determining unit 107. Then, the data information transmission processing unit 109 outputs the pre-coded data signal to the radio transmission processing unit 119.

In addition, the control information transmission processing unit 111 and the reference signal transmission processing unit 113 may perform precoding with respect to a control signal and a reference signal (particularly, DMRS) on the basis of the precoding weight information input from the precoding weight determining unit 107.

Figure 8:
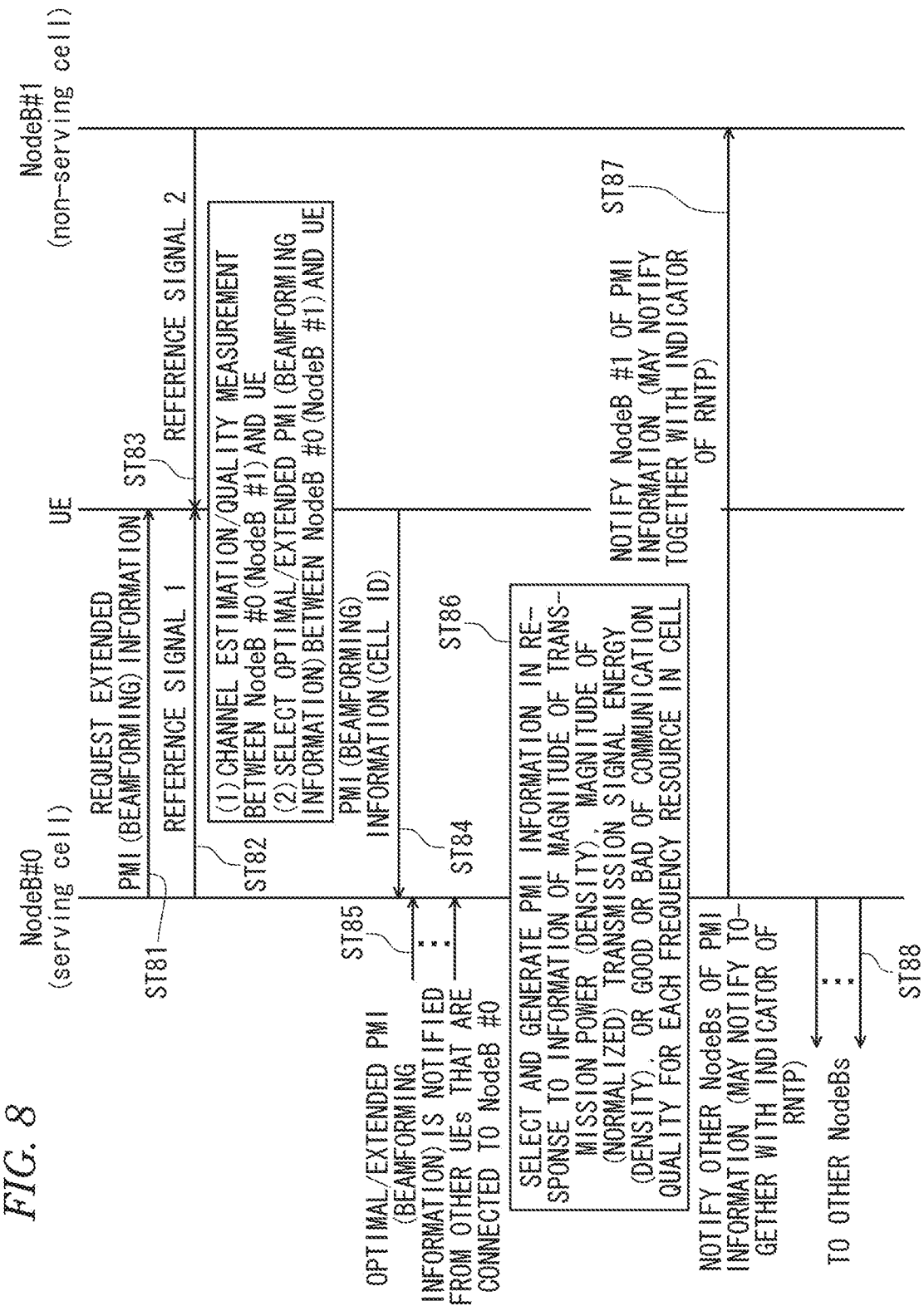
FIG. 8 is a flowchart illustrating a control sequence of a transmission system according to the first modification example.

A flow illustrating a control sequence of the transmission system according to the first modification example will be described with reference to FIG. 8. FIG. 8 shows a flowchart illustrating a control sequence of the transmission system according to the first modification example.

In step ST81, the NodeB #0 (serving cell) transmits an extended PMI (beamforming) request signal toward a UE.

In steps ST82 and ST83, the UE receives a reference signal of the NodeB #0 that is a serving cell, and a reference signal of the NodeB #1 (non-serving cell) that is another cell.

In step ST84, the UE feedback-transmits the PMI information to the NodeB #0 as a control signal.

In step ST85, the NodeB #0 receives the PMI information from other UEs that are connected to the serving cell.

In step ST86, the NodeB #0 generates and selects the PMI information in response to information of the transmission power (density), (normalized) transmission signal energy (density), or a magnitude (good or bad) of a communication quality for each frequency resource in the serving cell.

In step ST87, the NodeB #0 notifies the NodeB #1 of the PMI information and information of the selected frequency band position.

In step ST88, the NodeB #0 notifies other NodeBs of the PMI information and the information of the selected frequency band position.

As described above, according to the transmission system related to the first modification example, the communication apparatus 100A may autonomously select precoding (beamforming) information in a specific resource, which other nodes need for the ICIC, only with the serving node on the basis of information (for example, an RNTP indicator) about the magnitude of future transmission signal power in the serving cell, such that overhead related to the PMI (beamforming weight (for example, the number of PMI lists information) that is notified over the backhaul may be reduced.

In addition, in addition to the future transmission power (density) information for each frequency resource in the serving cell, the communication apparatus 100A may correlate information of the (normalized) transmission signal energy (density) or the magnitude (good or bad) of the communication quality (CQI), or the like, and the amount of precoding (beamforming) information (for example, the number of PMI lists) at the frequency resource position with each other. Therefore, the same effect as that obtained by the transmission system related to the above-described first modification example may be obtained.

In addition, in a case where the communication apparatus 100A notifies other nodes of the future transmission power (density) information, the (normalized) transmission signal energy (density), or the magnitude (good or bad) of the communication quality (CQI) for each frequency resource together with each other, the information of the selected frequency resource position may not be notified. When the above-described correlation rule is shared between coordination nodes, for example, since the frequency resource at which the PMI is notified may be specified from the notified transmission power information for each frequency resource, even when the position information of the selected frequency resource is not notified, the same effect as that obtained by the transmission system related to the first modification example may be obtained.

Second Modification Example

As the transmission power (density) or (normalized) transmission signal energy (density) for each frequency resource in the serving cell is large (or small), or as the communication quality becomes better (or worse) for each frequency resource in the serving cell, a communication apparatus of a second modification example related to the first embodiment allows the extended PMI list selecting unit 131 to increase (or decrease) the amount of the precoding (beamforming) information (for example, the number of PMI lists) at a corresponding resource.

Here, an operation of the communication apparatus of the second modification example related to the first embodiment is different from the operation of the communication apparatus 100A in an operation of the extended PMI list selecting unit 131, and therefore, in this modification example, the operation of the extended PMI list selecting unit 131 that performs the different operation will be mainly described.

Figure 9:
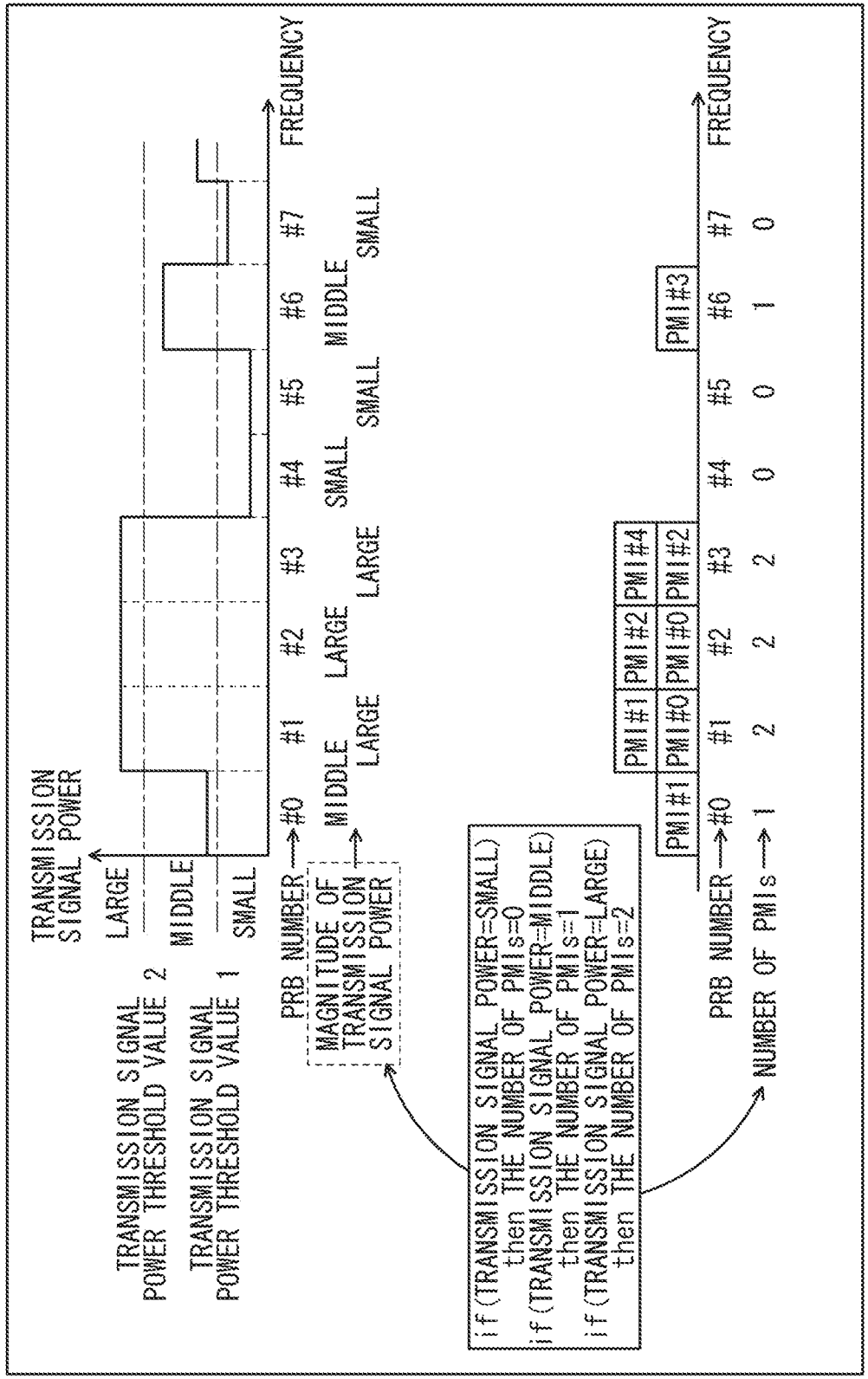
FIG. 9 is an example of an extended PMI list according to a second modification example of the first embodiment.

The operation of the extended PMI list selecting unit 131 in the transmission system related to the second modification example will be described with reference to FIG. 9. FIG. 9 shows an example of the extended PMI list in the second modification example. In FIG. 9, the transmission power (density) for each frequency resource is also shown in the extended PMI list. In the extended PMI list shown in FIG. 9, the number of extended PMI lists at a frequency resource varies in response to the magnitude of the transmission signal power for each frequency resource.

As shown in FIG. 9, the extended PMI list selecting unit 131 sets two threshold values (a transmission signal power threshold value 1 and a transmission signal power threshold value 2) to the transmission signal power, and defines the magnitude of the transmission signal power in three regions ("large", "middle", and "small"). At this time, (1) when the value of the transmission signal power is in the "small" region, the number of extended PMI lists to be notified is set to 0, (2) when the value of the transmission signal power is in the "middle" region, the number of PMI lists to be notified is set to 1, and (3) when the value of the transmission signal power is in the "large" region, the number of extended PMI lists to be notified is set to 2, In addition, the extended PMI list selecting unit 131 selects the extended PMI for each frequency resource, that is, for PRB numbers of #0 to #7 on the basis of the number of extended PMI lists depending on the magnitude of the transmission signal power.

For example, as shown in FIG. 9, at PRB #1, since the value of the transmission signal power is in the "large" region, the number of extended PMI lists to be notified becomes 2. Therefore, at PRB #1, two extended PMIs of extended PMI #1 and extended PMI #0 are selected. In addition, at PRB #4, since the value of the transmission signal power is in the "small" region, the number of extended PMI lists to be notified becomes 0. Therefore, at PRB #4, the extended PMI is not selected in the extended PMI list shown in FIG. 9.

As described above, in the transmission system related to the second modification example, the larger (or smaller) the transmission signal power for each frequency resource, the further the extended PMI list selecting unit 131 increases (or decreases) the amount of the precoding (beamforming) information (for example, the number of PMI lists) at this resource.

Therefore, in regard to the transmission system related to the second modification example, the communication apparatus of the second modification example related to the first embodiment increases coordination CB/JP information only in a specific frequency resource in which large interference may be applied to other cells with high probability when seen from the serving node (large interference from other cells when seen from other nodes), such that the ICI reduction effect due to the coordination ICIC among a plurality of nodes may be further improved.

In addition, in regard to the transmission system related to the second modification example, the communication apparatus of the second modification example related to the first embodiment may perform correlation with respect to the amount of the beamforming information in a corresponding band on the basis of the transmission signal power density and the (normalized) transmission signal energy (density) in addition to the transmission signal power for each frequency resource. For example, the larger (or smaller) the transmission signal power density, the (normalized) transmission signal energy (density), the further the amount of the precoding (beamforming) information (for example, the number of PMI lists) at a corresponding resource may be increased (or decreased). Therefore, the same effect as described above may be obtained.

In addition, in regard to the transmission system related to the second modification example, the communication apparatus of the second modification example related to the first embodiment may correlate communication quality (CQI (Channel Quality)) information (SIR (Signal-to-Interference Ratio), SINR (Signal-to-Interference plus Noise Ratio), or the like) that is fed back from a UE, and the amount of the beamforming information at a corresponding band with each other. In addition, the communication apparatus may correlate measurement information (RSRP, RSRQ, RSSI, or the like) that is fed back from a UE, and the amount of the beamforming information at a corresponding band with each other. For example, the larger (or smaller) the communication quality (CQI (Channel Quality)), RSRP, RSRQ, or the like), the further the amount of the precoding (beamforming) information (for example, the number of PMI lists) may be increased (or decreased) at a corresponding resource. Therefore, even when a UE, which needs a high-speed rate (needs high CQI (SINR)), other than a UE that is present at a cell edge is allocated to the frequency resource, inter-cell interference with respect to the UE may be reduced.

Third Modification Example

A communication apparatus of a third modification example related to the first embodiment allows the extended PMI list selecting unit 131 to correlate a binary indicator (information representing future transmission signal power) of the RNTP for each physical resource block (PRB), and an amount of the precoding (beamforming) information (for example, the number of PMI lists) of a corresponding band with each other.

Here, an operation of the communication apparatus of the third modification example related to the first embodiment is different from the operation of the communication apparatus 100A in an operation of the extended PMI list selecting unit 131, and therefore, in this modification example, the operation of the extended PMI list selecting unit 131 that performs the different operation will be mainly described.

In DL transmission of LTE Rel. 8, RNTP (Relative Narrowband TX Power), which is an index representing information of future transmission signal power (normalized EPRE (Energy Per Resource Element)) in physical resource block (PRB) units, is defined as a binary indicator (0 or 1). In this modification example, an index, which is used in the DL transmission of LTE Rel. 8, is used. That is, the communication apparatus of the third modification related to the first embodiment reuses a format defined in LTE Rel. 8, that is, may maintain backward compatibility.

Figure 10:
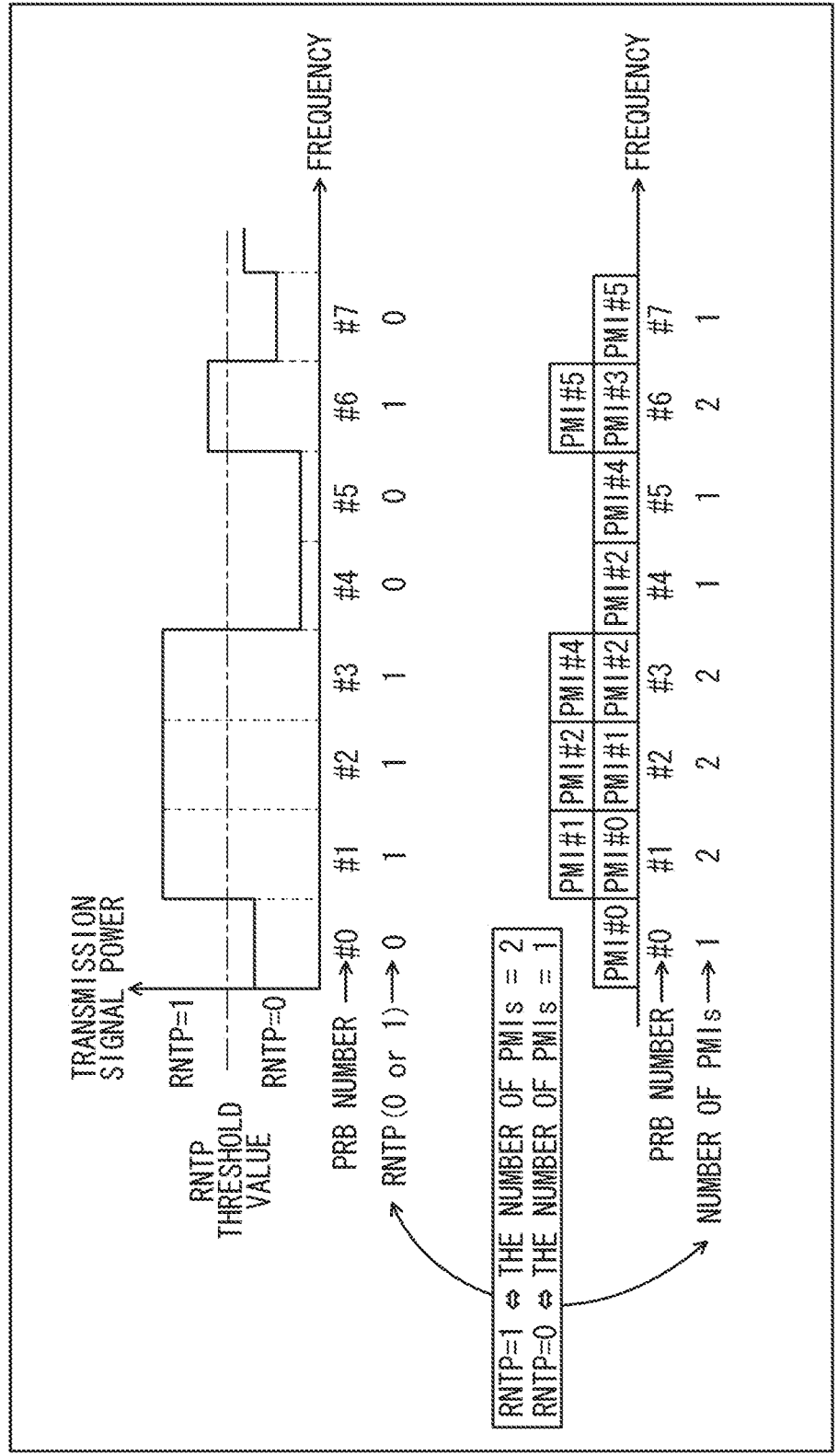
FIG. 10 is an example of an extended PMI list according to a third modification example of the first embodiment.

Here, in regard to the transmission system related to the third modification example, the operation of the extended PMI list selecting unit 131 will be described with reference to FIG. 10. FIG. 10 shows an example of the extended PMI list according to the third modification example. In FIG. 10, the binary indicator of the RNTP for each frequency resource (for each of PRBs #0 to #7), which corresponds to the extended PMI list, is also shown. The horizontal axis represents a frequency.

As shown in FIG. 10, the extended PMI list selecting unit 131 sets a threshold value of the RNTP, and (1) in a case where a value of the RNTP is less than the threshold value of the RNTP, the binary indicator of the RNTP is set to 0, and (2) in a case where a value of the RNTP is larger than the threshold value of the RNTP, the binary indicator of the RNTP is set to 1. In addition, (1) in a case where the binary indicator of the RNTP is 1, the number of PMI lists to be notified is set to 2, and (2) in a case where the binary indicator of the RNTP is 0, the number of PMI lists to be notified is set to 1. That is, the number of PMI lists in each of the PRBs #0 to #7 varies in response to the binary indicator of 0 or 1 of the RNTP for each frequency resource.

For example, in the extended PMI list shown in FIG. 10, since the binary indicator of the RNTP is 0 at PRB #0, the number of PMI lists to be notified is 1. Therefore, at PRB #0, the extended PMI list selecting unit 131 sets the number of the PMI lists to be notified to 1, and selects PMI #0. In addition, in regard to the extended PMI list shown in FIG. 10, since the binary indicator of the RNTP is 1 at PRB #3, the number of PMI lists to be notified is 2. Therefore, at PRB #3, the extended PMI list selecting unit 131 sets the number of PMI lists to be notified to 2, and selects PMI #2 and PMI #4.

That is, in regard to the transmission system related to the third modification example, the communication apparatus of the third modification example related to the first embodiment changes (increases or decreases) the amount of the precoding (beamforming) information (for example, the number of PMI lists) at a corresponding frequency resource in response to the value (1 or 0) of the binary indicator of the RNTP for each frequency resource. That is, the communication apparatus of the third modification example related to the first embodiment variably controls the number of PMIs in a frequency domain.

Therefore, in regard to the transmission system related to the third modification example, since the communication apparatus of the third modification example related to the first embodiment correlates the indicator of the RNTP and the amount of the precoding (beamforming) information (for example, the number of PMI lists) with each other, and thereby may reuse a format defined by LTE Rel. 8, that is, may maintain backward compatibility, the number of test items and the number of processes, which are requisite (new) in practical use, may be reduced.

Fourth Modification Example

In regard to a transmission system of a fourth modification example related to the first embodiment, a communication apparatus of the fourth modification example related to the first embodiment allows the extended PMI list selecting unit 131 to select a PMI list of a physical resource block (PRB) in which the value of the binary indicator of the RNTP for each frequency resource is 1 and notifies other nodes of corresponding precoding (beamforming) information via the backhaul.

In addition, in regard to this modification example, the communication apparatus of fourth modification example related to the first embodiment may not notify or select the precoding (beamforming) information of the PRB in which the value of the binary indicator of the RNTP for each frequency resource is 0.

Here, the operation of the communication apparatus of the fourth modification example related to the first embodiment is different from the operation of the communication apparatus 100A in an operation of the extended PMI list selecting unit 131, and in this modification example, the operation of the extended PMI list selecting unit 131 that performs a different operation will be mainly described.

Figure 11:
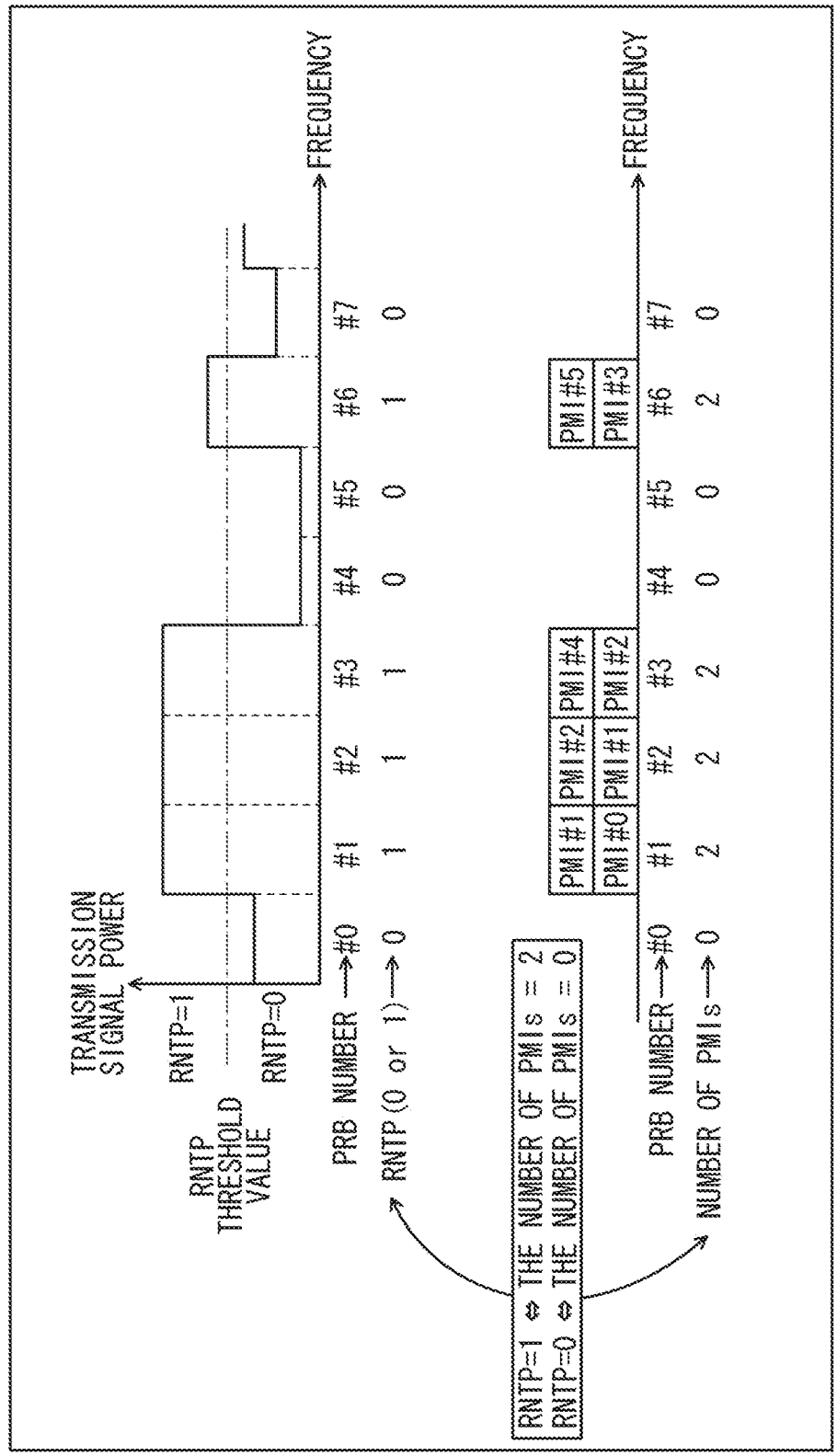
FIG. 11 is an example of an extended PMI list according to a fourth modification example of the first embodiment.

In regard to the transmission system related to the fourth modification example, the operation of the extended PMI list selecting unit 131 will be described with reference to FIG. 11. FIG. 11 shows an example of the extended PMI list according to the fourth modification example. In FIG. 11, the binary indicator of the RNTP for each frequency resource (for each of PRBs #0 to #7), which corresponds to the extended PMI list, is also shown.

As shown in FIG. 11, the extended PMI list selecting unit 131 sets a threshold value of the RNTP, and (1) in a case where a value of the RNTP is less than the threshold value of the RNTP, the binary indicator of the RNTP is set to 0, and (2) in a case where a value of the RNTP is larger than the threshold value of the RNTP, the binary indicator of the RNTP is set to 1. In addition, (1) in a case where the binary indicator of the RNTP is 1, the number of PMI lists to be notified is set to 2, and (2) in a case where the binary indicator of the RNTP is 0, the number of PMI lists to be notified is set to 0. That is, the number of PMI lists in each of the PRBs #0 to #7 varies in response to the binary indicator of 0 or 1 of the RNTP for each frequency resource. In addition, in an example of this modification example, in a case where the binary indicator of the RNTP is 0, the PMI list to be notified is not present.

For example, in the extended PMI list shown in FIG. 11, since the binary indicator of the RNTP is 0 at PRB #0, the number of PMI lists to be notified is 0. Therefore, at PRB #0, the extended PMI list selecting unit 131 does not select the PMI lists to be notified. In addition, in regard to the extended PMI list shown in FIG. 11, since the binary indicator of the RNTP is 1 at PRB #2, the number of PMI lists to be notified is 2. Therefore, at PRB #2, the extended PMI list selecting unit 131 sets the number of PMI lists to be notified to 2, and selects PMI #1 and PMI #2.

That is, in regard to the transmission system related to the fourth modification example, the communication apparatus of the fourth modification example related to the first embodiment may further reduce the overhead related to precoding (beamforming weight (for example, the number of PMI lists)) information to be notified over the backhaul while maintaining the ICI reduction effect due to the coordinated CB among a plurality of nodes.

Fifth Modification Example

In regard to a transmission system related to a fifth modification example of the first modification, in a case where the indicator of the RNTP for each frequency resource (for example, PRB) is expressed by three values or more, the larger (or smaller) transmission signal power value shown by the multi-value indicator of the RNTP, the further a communication apparatus of the fifth modification example related to the first embodiment decreases (or increases) the amount of the precoding (beamforming) information (for example, the number of PMI lists) at a corresponding band.

Here, the operation of the communication apparatus of the fifth modification example related to the first embodiment is different from the operation of the communication apparatus 100A in an operation of the extended PMI list selecting unit 131, and in this modification example, the operation of the extended PMI list selecting unit 131 that performs a different operation will be mainly described.

Figure 12:
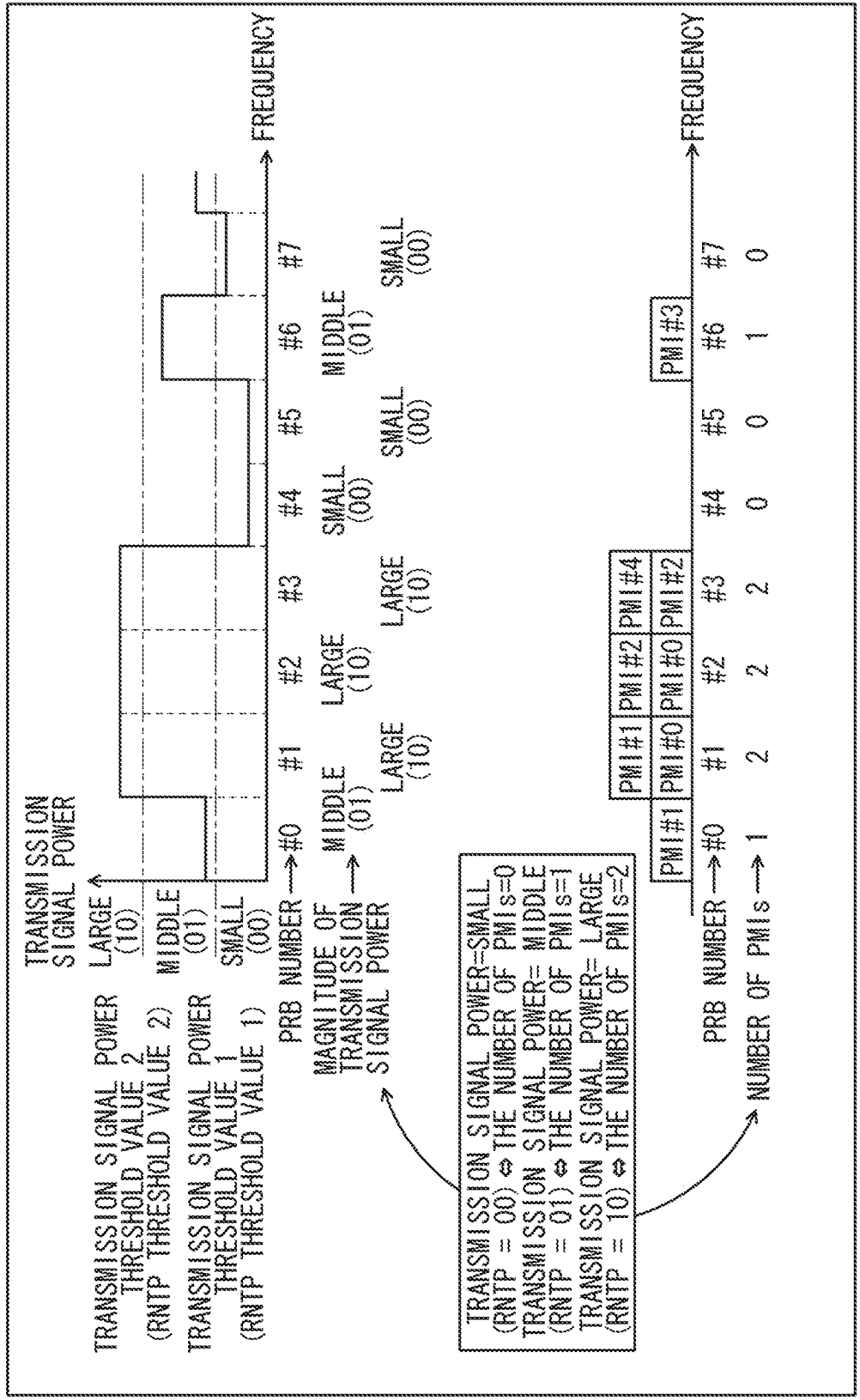
FIG. 12 is an example of an extended PMI list according to a fifth modification example of the first embodiment.

In regard to the transmission system related to the fifth modification example, the operation of the extended PMI list selecting unit 131 will be described with reference to FIG. 12. FIG. 12 shows an example of the extended PMI list according to the fifth modification example. In FIG. 12, the ternary indicator of the RNTP for each frequency resource (for each of PRBs #0 to #7), which corresponds to the extended PMI list, is also shown.

As shown in FIG. 12, correlation of three regions ("large", "middle", and "small") representing the magnitude of the transmission signal power is made in response to the ternary indicator value ("10", "01", and "00") of the RNTP. The three regions ("large", "middle", and "small") representing the magnitude of the transmission signal power are discriminated by setting two threshold values (transmission signal power threshold value 1 and transmission signal power threshold value 2) to the transmission power. That is, the value "10" of the ternary indicator of the RNTP corresponds to the region "large" representing the magnitude of the transmission signal power. The value "01" of the ternary indicator of the RNTP corresponds to the region "middle" representing the magnitude of the transmission signal power. The value "00" of the ternary indicator of the RNTP corresponds to the region "small" representing the magnitude of the transmission signal power.

In addition, in FIG. 12, (1) in a case where the value of the ternary indicator of the RNTP is "00", the number of PMI lists to be notified is set to 0, (2) in a case where the value of the ternary indicator of the RNTP is "01", the number of PMI lists to be notified is set to 1, and (3) in a case where the value of the ternary indicator of the RNTP is "10", the number of PMI lists to be notified is set to 2. That is, the larger the value of the transmission signal power of the region is, the larger the value of the ternary indicator of the RNTP is. Conversely, the smaller the value of the transmission signal power of the region is, the smaller the value of the ternary indicator of the RNTP is.

As shown in FIG. 12, for example, at PRB #0, the value of the transmission signal power is present in a region to which the value "01" of the ternary indicator of the RNTP is applied and in which the value of the transmission signal power is "middle". Therefore, the number of extended PMI lists to be notified becomes 1. Therefore, like the extended PMI list shown in FIG. 12, at PRB #0, the extended PMI list selecting unit 131 selects one extended PMI (extended PMI #1).

In addition, as shown in FIG. 12, for example, at PRB #1, the value of the transmission signal power is present in a region to which the value "10" of the ternary indicator of the RNTP is applied and in which the value of the transmission signal power is "large". Therefore, the number of extended PMI lists to be notified becomes 2. Therefore, like the extended PMI list shown in FIG. 12, at PRB #1, the extended PMI list selecting unit 131 selects two extended PMIs (extended PMI #0 and extended PMI #1).

In addition, as shown in FIG. 12, for example, at PRB #4, the value of the transmission signal power is present in a region to which the value "00" of the ternary indicator of the RNTP is applied and in which the value of the transmission signal power is "small". Therefore, the number of extended PMI lists to be notified becomes 0. Therefore, like the extended PMI list shown in FIG. 12, at PRB #4, the extended PMI list selecting unit 131 does not select extended PMI.

That is, in regard to the transmission system related to the fifth modification example, in a case where the indicator of the RNTP for each frequency resource (for example, PRB) is expressed by three values or more, the larger (or smaller) transmission signal power value shown by the multi-value indicator of the RNTP, the further a communication apparatus of the fifth modification example related the first embodiment increases (decreases) the amount of the precoding (beamforming) information (for example, the number of PMI lists) in a corresponding band. Therefore, in regard to the transmission system related to the fifth modification example, the communication apparatus of the fifth modification example related to the first embodiment may effectively suppress interference (ICI) using ICIC with a priority give to a frequency resource in which large interference (ICI) may be applied to other cells with high probability. In addition, an appropriate amount of PMI information, which accurately reflects the magnitude of other-cell interference for each frequency resource, may be notified.

In addition, in the fifth modification example, the multi-value indicator of the RNTP may be notified together with the PMI information. Therefore, effective beamforming may be performed by using two of the magnitude of the transmission power of other cells (interference power when seen from the serving cell) in a frequency domain and the precoding information in a spatial domain.

In addition, in the transmission system according to the first embodiment and the modification examples 1 to 5, in a case where the CB is performed as the ICIC, the communication apparatus may perform notification of precoding (beamforming) information (for example, PMI list) that suppresses (or prohibits or restrains) the use in neighbor cells as the precoding (beamforming) information (for example, PMI list) to be notified to other nodes.

In addition, in the transmission system according to the first embodiment and the modification examples 1 to 5, in a case where the JP is performed as the ICIC, the communication apparatus may perform notification of precoding (beamforming) information (for example, PMI list) that encourages (preferential) use in neighbor cells as the precoding (beamforming) information (for example, PMI list) to be notified to other nodes.

In addition, in the transmission system according to the first embodiment and the modification examples 1 to 5, the communication apparatus may perform notification of a transmission mode that represents the CB or JP together with the precoding (beamforming) information (for example, PMI list).

In this manner, to reduce other-cell interference, the coordinated beamforming (CB) sets the precoding (beamforming) information, which is expected not to be used by other cells (whose use is suppressed, prohibited, and restricted), as useful information. On the other hand, to reduce other-cell interference, the joint-processing (JP) set the precoding (beamforming) information, which is encouraged to be used by other cells, as useful information. Therefore, in each of the CS, CB, and JP, appropriate precoding (beamforming) may be performed between coordinated cells.

In addition, in the transmission system according to the first embodiment and the modification examples 1 to 5, in a case where frequency resources at which the PMI is notified are present in succession, an initiation number and a termination number of the frequency resources may be notified as frequency resource position information of the selected PMI. For example, in regard to a case where the frequency resources are made up of 110 PRBs (a case where PRB numbers of 0 to 109 are expressed with 7 bits), when the PRB numbers at which the PMI is notified are 5 to 15, "initiation number=0000101 (=5)" and "termination number=0001111 (=15)" may be notified.

In addition, in the transmission system according to the first embodiment and the modification examples 1 to 5, in a case where frequency resources at which the PMI is notified are present in succession, an initiation number (or a termination number) of the frequency resource as frequency resource position information of the selected PMI and an absolute value of a length (a bandwidth) of the successive frequency resources may be notified. For example, in regard to a case where the frequency resources are made up of 110 PRBs (a case where PRB numbers of 0 to 109 are expressed with 7 bits), when the PRB numbers at which the PMI is notified are 5 to 15, "initiation number=0000101 (=5)" ("termination number=0001111 (=15)") and "length=0001010 (=10)" may be notified. In addition, in a case where the frequency resource initiation number (termination number) and the length are notified, the notified node may acquire the termination number (initiation number) by adding the length to the initiation number (by subtracting the length from the termination number). In addition, an identifier (flag), which indicates the notification of the initiation number or the termination number, may be transmitted in addition to the absolute value of the length (bandwidth) of the frequency resource.

In regard to the transmission system according to the first embodiment and the modification examples 1 to 5, the communication apparatus 100 may further reduce the overhead related to the position information of the frequency resource at which the PMI is notified while maintaining the ICI reduction effect due to the above-described two notification methods.

(Reduction of Frequency Resource Position Information)

In addition, in regard to the transmission system related to the first embodiment, description was made with respect to a case in which the communication apparatus 100 expresses the frequency resource position information of the selected PMI with a bitmap of a frequency resource, which indicates the entirety of the system band, and the entirety information is notified, but it is not limited thereto. For example, in regard to the transmission system related to the first embodiment, since the communication apparatus 100 uses a viewpoint in which a proportion of the number of UEs that are objects of the CoMP is greatly smaller than the number of total UEs in a cell (the number of UEs that are not objects of the CoMP), frequency resource position information of the selected PMI may be notified with methods described below.

That is, in regard to the transmission system related to the first embodiment, the communication apparatus 100 may define a plurality of sub-bands by dividing the system band, may indicate the resource of the PMI notification only in the sub-band with a bitmap, and may notify other nodes of a sub-band number and the frequency resource position in the sub-band with a bitmap.

Figure 13:
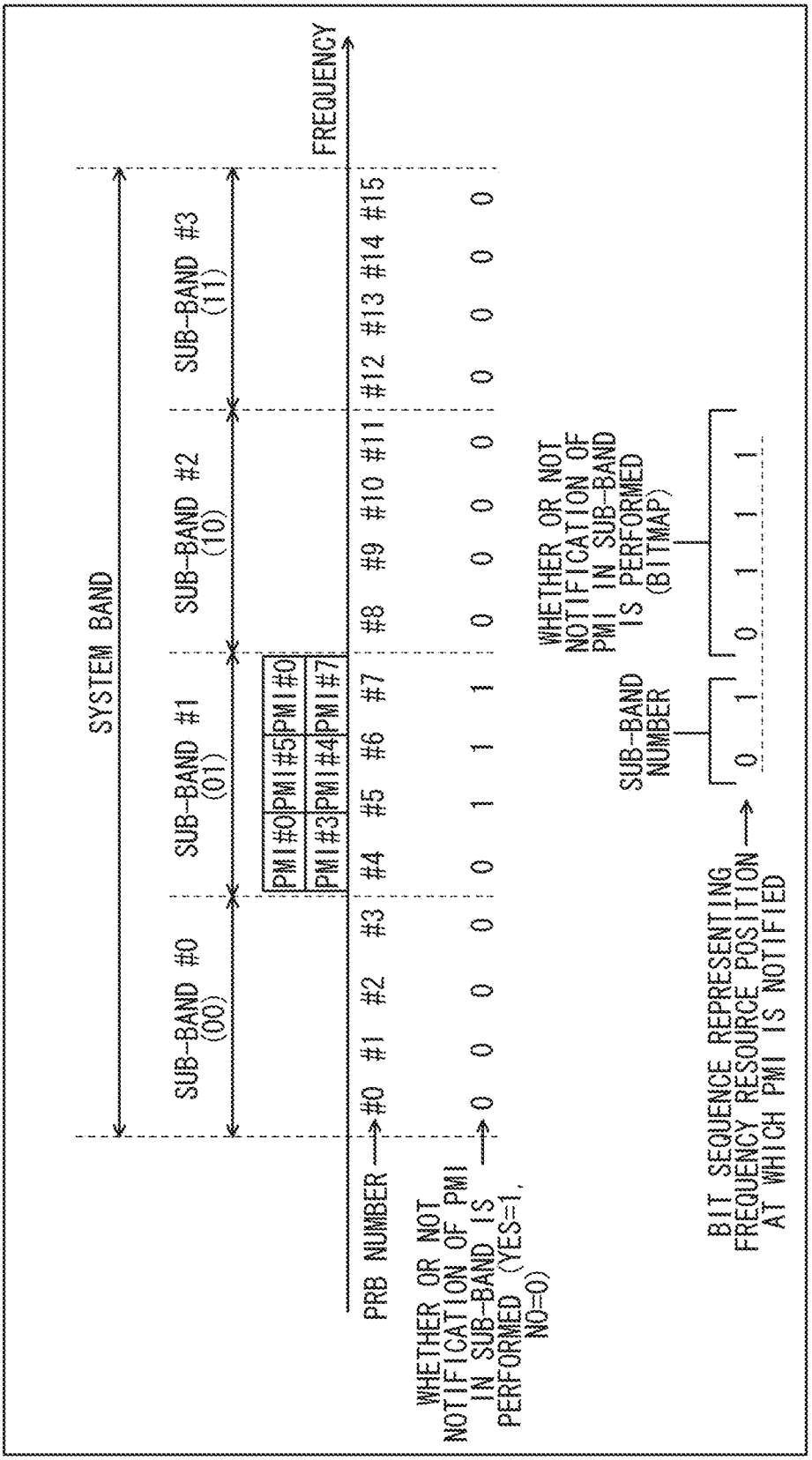
FIG. 13 is a diagram illustrating an example (1) in which a sub-band number and whether or not PMI notification in the same sub-band is performed are notified with a bitmap in the first embodiment.

Therefore, a description will be made with respect to an example in which the sub-band number and whether or not the PMI notification in the sub-band is performed is notified with a bitmap with reference to FIG. 13. FIG. 13 shows a diagram illustrating an example (1) in which a sub-band number and whether or not PMI notification in the sub-band is performed are notified with a bitmap.

As shown in FIG. 13, in regard to the transmission system related to the first embodiment, the system band is equally divided into four and four sub-bands are defined. That is, a sub-band #0 is correlated with a sub-band number (00). A sub-band #1 is correlated with a sub-band number (01). A sub-band #2 is correlated with a sub-band number (10). A sub-band #3 is correlated with a sub-band number (11).

In addition, as shown in FIG. 13, it is assumed that in each sub-band, four physical resource blocks are present. That is, in the sub-band #0, four physical resource blocks PRB #0 to PRB #3 are present. In the sub-band #1, four physical resource blocks PRB #4 to PRB #7 are present. In the sub-band #2, four physical resource blocks PRB #8 to PRB #11 are present. In the sub-band #3, four physical resource blocks PRB #12 to PRB #15 are present.

In addition, in the system band shown in FIG. 13, only three physical resource blocks PRB #5, PRB #6, and PRB #7, which are included in the sub-band #1 with which the sub-band number (01) is correlated, are selected as a PMI to be notified to other nodes.

That is, in regard to the transmission system related to the first embodiment, the communication apparatus 100 selects the PMI to be notified to other nodes only in the sub-band #1 with which the sub-band number (01) is correlated. In this case, a bit sequence that represents the frequency resource position of the PMI to be notified to other nodes is made up of "sub-band number" and "whether or not the PMI notification in the sub-band is performed (bitmap)". That is, as a bit sequence in which the sub-band number (01) that corresponds to the sub-band #1, and a bitmap (0111), which represents whether or not the PMI notification in the sub-band is performed, are combined, (010111) is notified. Furthermore, the communication apparatus 100 may not perform notification of a PMI list to be notified in addition to the bit sequence (010111). Here, it is assumed that as the number of PMIs to be notified to each PRB, a fixed value of 2 is used.

Therefore, in regard to the transmission system related to the first embodiment, the communication apparatus 100 may further reduce the overhead that is necessary for the notification while accommodating the UE, which is an object of the CoMP in which a proportion of a frequency resource that is used in a cell is small, in a specific limited band.

Here, a CoMP UE is a UE that is an object of the CoMP. In addition, non-CoMP UE is a UE that is not an object of the CoMP.

Figure 14:
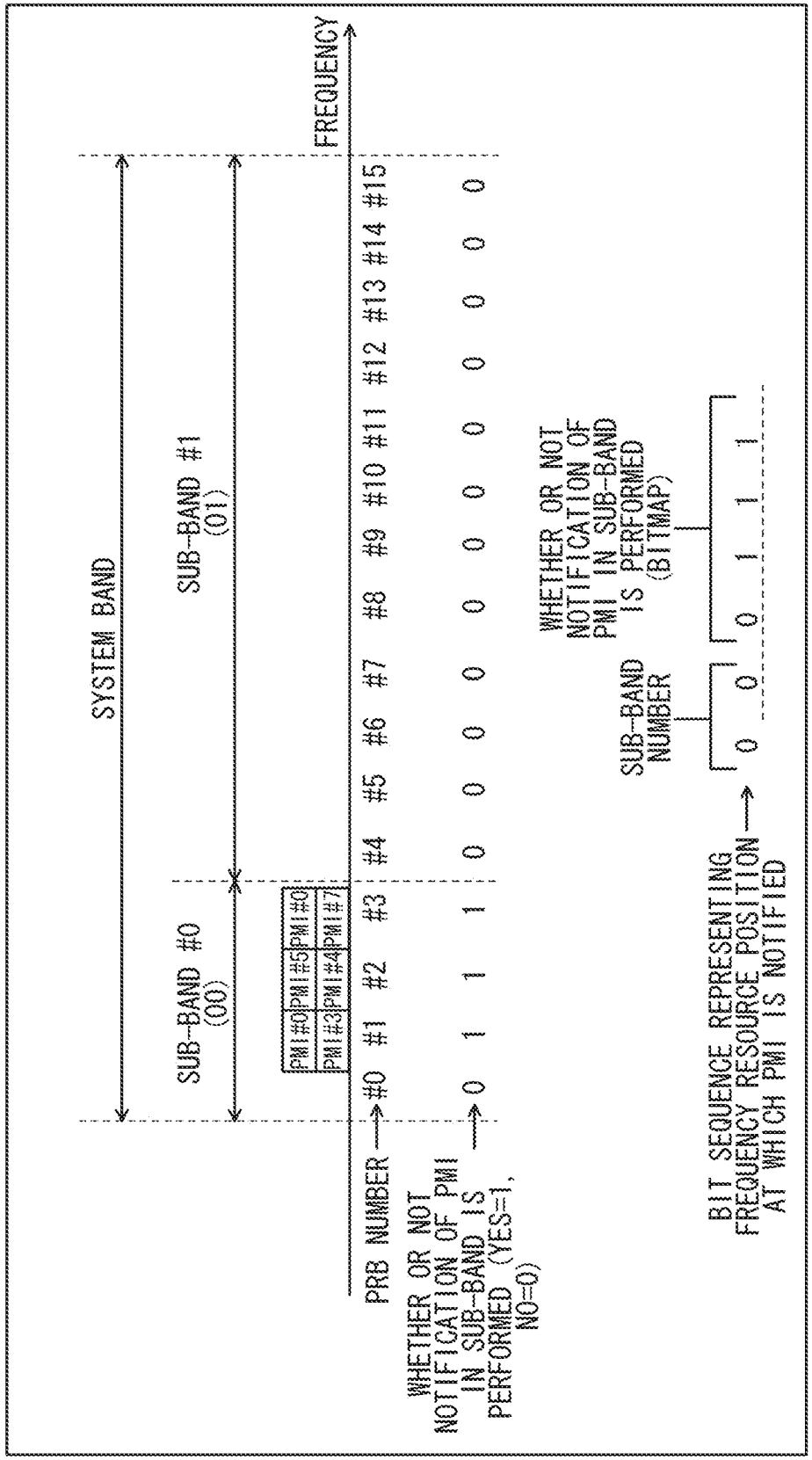
FIG. 14 is a diagram illustrating an example (2) in which the sub-band number and whether or not PMI notification in the same sub-band is performed are notified with a bitmap in the first embodiment.

In addition, in a system band shown in FIG. 13, description was made with respect to an example in which the system band is equally divided and a plurality of sub-bands having an equal bandwidth are defined, but it is not limited thereto. For example, the bandwidths to divide the system band may be different from each other. This case will be described with reference FIG. 14. FIG. 14 shows a diagram illustrating an example (2) in which the sub-band number and whether or not PMI notification in the same sub-band is performed are notified with a bitmap in the first embodiment.

For example, in a case where the UE that is an object of the CoMP and the non-CoMP UE are effectively used with a frequency resource in a system band, generally, the number of them is different in each case (the number of CoMP UEs<the number of non-CoMP UEs). Therefore, for example, it is considered that the system band is divided in proportion to the number of CoMP UEs to generate the sub-band, and the frequency resource is effectively used.

Here, as shown in FIG. 14, in regard to the transmission system related to the first embodiment, the system band is divided into two and two sub system bands are defined. That is, a sub-band #0 is correlated with a sub-band number (00). A sub-band #1 is correlated with a sub-band number (01). This system band and the system band shown in FIG. 13 are different in that four equally spaced physical resource blocks PRB #0 to PRB #3 are included in the sub-band #0, but twelve equally spaced physical resource blocks PRB #4 to PRB #15 are included in the sub-band #1 so as to unequally divide the system band.

In addition, in the system band shown in FIG. 14, only three physical resource blocks PRB #1, PRB #2, and PRB #3, which are included in the sub-band #1 with which sub-band number (00) are correlated, are selected as a PMI to be notified to other nodes.

That is, in the transmission system related to the first embodiment, the communication apparatus 100 selects the PMI to be notified to other nodes only in the sub-band #1 with which the sub-band number (00) is correlated. Furthermore, a bit sequence representing a frequency resource position of the PMI to be notified to other nodes is made up of "sub-band number" and "whether or not the notification of the PMI in the sub-band is performed (bitmap)". That is, as a bit sequence in which the sub-band number (00) corresponding to the sub-band #1 and the bitmap (0111) representing whether or not the notification of the PMI in the sub-band is performed are combined, (010111) is notified. Furthermore, the communication apparatus 100 may not perform notification of the selected PMI list in addition to this bit sequence (010111). Here, it is assumed that as the number of PMIs to be notified to each PRB, a fixed value of 2 is used.

Therefore, in regard to the transmission system related to the first embodiment, the communication apparatus 100 may further effectively realize the ICIC in the frequency domain and the spatial domain with small overhead.

In addition, in regard to a method of performing notification of information of the sub-band number and the bitmap representing whether or not the notification of the PMI in the sub-band is performed, the bit sequence representing the sub-band number may be notified with a transmission format which more hardly causes an error than the bitmap information representing whether or not the notification of the PMI in the sub-band is performed. For example, a coding rate of error correction code may be improved by treating the sub-band number as an MSB (Most Significant Bit). In addition, in regard to a high-level modulation (16QAM or the like), allocation may be made to a bit position of constellation with high reliability. Therefore, the CoMP may be reliably operated among a plurality of nodes.

In addition, in regard to the notification of the information of the sub-band number and the bitmap representing whether or not the notification of the PMI in the sub-band is performed, notification of a plurality of frequency resource numbers (for example, PRB numbers), at which the PMI in the sub-band is notified, may be performed.

For example, in regard to a case where the frequency resource is made up of 110 PRBs (a case where PRB numbers of 0 to 109 are expressed with 6 bits), when the PRB numbers at which the PMI is notified are 5 and 20, "0000101 (=5)" and "00010100 (=20)" may be notified.

In addition, in regard to the notification of the information of the sub-band number and the bitmap representing whether or not the notification of the PMI in the sub-band is performed, in a case where the frequency resources at which the PMI in the sub-band is notified are present in succession, an initiation number and a termination number of the frequency resources may be notified.

For example, in regard to a case where the frequency resources are made up of 110 PRBs (a case where PRB numbers of 0 to 109 are expressed with 7 bits), when the PRB numbers at which the PMI is notified are 5 to 15, "initiation number=0000101 (=5)" ("termination number=0001111 (=15)") may be notified.

In addition, in regard to the notification of the information of the sub-band number and the bitmap representing whether or not the notification of the PMI in the sub-band is performed, in a case where the frequency resources at which the PMI in the sub-band is notified are present in succession, an initiation (or termination) number of the frequency resources, an absolute value of the length (bandwidth) of the successive frequency resources may be notified.

For example, in regard to a case where the frequency resources are made up of 110 PRBs (a case where PRB numbers of 0 to 109 are expressed with 7 bits), when the PRB numbers at which the PMI is notified are 5 to 15, "initiation number=0000101 (=5)" ("termination number=0001111 (=15)") and "length=0001010 (=10)" may be notified. In addition, in the case of performing notification of the frequency resource initiation number (termination number) and the length, the notified node may acquire the termination number (initiation number) by adding the length to the initiation number (by subtracting the length from the termination number). In addition, an identifier (flag), which indicates the notification of the initiation number or the termination number, may be transmitted in addition to the absolute value of the length (bandwidth) of the frequency resource.

In regard to the transmission system according to the first embodiment, the communication apparatus 100 may further reduce the overhead related to the position information of the frequency resource at which the PMI is notified while maintaining the ICI reduction effect due to the above-described notification method of information of the sub-band number and the bitmap representing whether or not PMI notification in the sub-band is performed.

Second Embodiment

Next, a second embodiment will be described in detail with reference to FIG. 15. In regard to the transmission system according to this embodiment, a communication apparatus according to the second embodiment has at least the following characteristics (1) and (2).

(1) In response to the number of 1's (or 0's) of a binary indicator of the RNTP within a sub-band, which is made up of a plurality of resource elements (REs), a plurality of sub-carriers, a plurality of PRBs, or the like, an amount of precoding (beamforming) information (for example, the number of PMI lists) is controlled in band units.

(2) The larger the number of RNTP of 1's (0's) within the sub-band, the further the amount of the precoding (beamforming) information (for example, the number of PMI lists) is increased (decreased).

Here, in regard to the transmission system according to the second embodiment, an operation of the extended PMI list selecting unit 131 of the communication apparatus according to the second embodiment will be described with reference to FIG. 15. In addition, other constituent elements are the same as those of the communication apparatus 100A in the first modification example related to the first embodiment, and therefore a description with respect to these will not be repeated.

Figure 15:
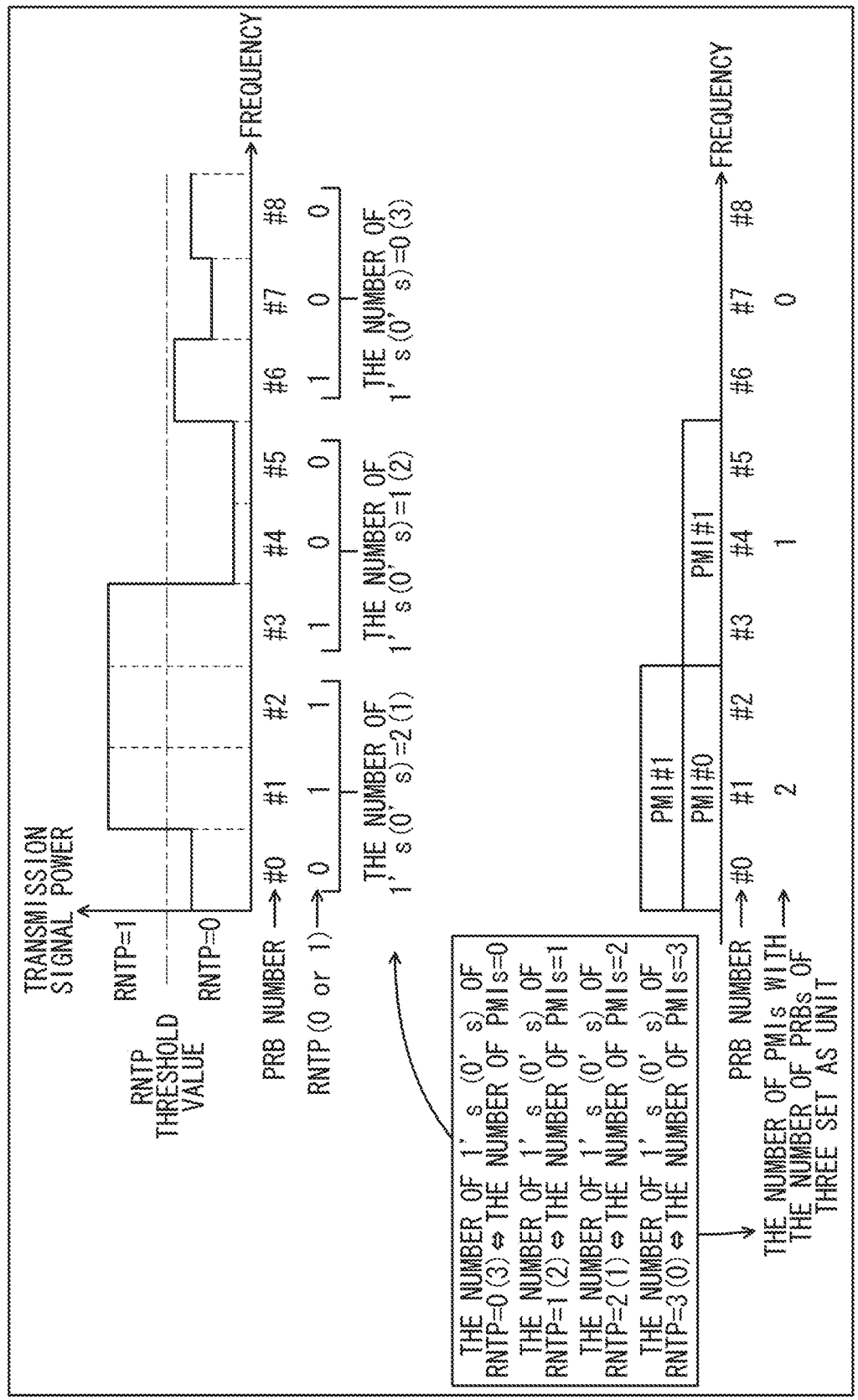
FIG. 15 is an example of an extended PMI list according to a second embodiment.

FIG. 15 shows an example of an extended PMI list in the second embodiment. FIG. 15 also shows a binary indicator of the RNTP for each frequency resource (for each of PRBs #0 to #8), which corresponds to the extended PMI list. In addition, FIG. 15 also shows a result of counting the number of the binary indicators (0's or 1's) of the RNTP every three PRBs.

Furthermore, in an example of the extended PMI list shown in FIG. 15, for each band of 3 PRBs in which the number of binary indicators (0's or 1's) of the RNTP is counted, (A) in a case where the number of PRBs in which the binary indicator of the RNTP is 1 (or 0) is 0 (or 3), the number of PMI lists to be notified is set to 0, (B) in a case where the number of PRBs in which the binary indicator of the RNTP is 1 (or 0) is 1 (or 2), the number of PMI lists to be notified is set to 1, (C) in a case where the number of PRBs in which the binary indicator of the RNTP is 1 (or 0) is 2 (or 1), the number of PMI lists to be notified is set to 2, and (D) in a case where the number of PRBs in which the binary indicator of the RNTP is 1 (or 0) is 3 (or 0), the number of PMI lists to be notified is set to 3.

For example, as shown in FIG. 15, in a band made up of three PRBs #0 to #2, since the number of PRBs in which the binary indicator of the RNTP is 1 (or 0) is 2 (or 1), the communication apparatus allows the extended PMI list selecting unit 131 to select two PMI lists (PMI #0 and PMI #1) to be notified.

That is, in regard to the transmission system according to this embodiment, the larger (smaller) the number of the frequency resources (PRBs in FIG. 15) in which the binary indicator of the RNTP is 1 (or 0) in the band of the sub-band, the further the communication apparatus according to the second embodiment increases (decreases) the amount of the precoding (beamforming) information (for example, the number of PMI lists).

As described with reference to FIG. 15, the communication apparatus according to the second embodiment variably controls an amount of the precoding (beamforming) information (for example, the number of PMI lists) in response to the number of 1's (or 0's) of the binary indicator of the RNTP within the sub-band, which is made up of the plurality of resource elements (REs), the plurality of sub-carriers, the plurality of PRBs, or the like, and notifies other nodes of the amount of information, and thereby realizes the ICIC of the frequency domain and the spatial domain.

Therefore, the communication apparatus according to the second embodiment may further reduce the overhead related to the precoding (beamforming weight (for example, the number of PMI lists)) information that is notified over the backhaul while maintaining the ICI reduction effect due to the coordinated CB between nodes.

Third Embodiment

Next, a third embodiment will be described in detail.

In regard to a transmission system according to the third embodiment, an operation of an extended PMI list selecting unit 131 of a communication apparatus 600 will be described with reference to FIGS. 16A and 16B. In addition, other constituent elements are the same as those of the communication apparatus 100A according to the first modification example of the first embodiment, and therefore a description thereof will not be repeated. FIGS. 16A and 16B show an example of an extended PMI list in the third embodiment.

In regard to the transmission system according to this embodiment, the communication apparatus 600 has at least the following characteristics (1) and (2).

(1) A plurality of threshold values for each cell (component carrier or the like) that is used at the time of determining a binary indicator of RNTP are correlated with an amount of precoding (beamforming) information (for example, the number of PMI lists).

(2) The larger (smaller) the threshold value of the RNTP, the further the amount of the precoding (beamforming) information (for example, the number of PMI lists) is increased (decreased).

Here, since the threshold value of the RNTP is set to a plurality of values for each node, implication of the RNTP (0 or 1) is different depending on the value of the threshold value. A case in which the threshold value of the RNTP is large and the binary indicator of the RNTP is 1, means that transmission signal power is significantly large. In addition, a case in which the threshold value of the RNTP is middle and the binary indicator of the RNTP is 1 means the transmission signal power is large.

Therefore, in this embodiment, as described below, the plurality of threshold values for each cell (component carrier or the like), which are used at the time of determining the binary indicator of the RNTP, are correlated with the amount of the precoding (beamforming) information (for example, the number of the PMI lists). That is, (A) in a case where the threshold value of the RNTP is large and the binary indicator of the RNTP is 1, the number of PMI lists that is notified is set to be large. (B) In a case where the threshold value of the RNTP is small and the binary indicator of the RNTP is 1, the number of PMI lists that is notified is set to be small.

Therefore, the fact that the implication of the binary indicator of the RNTP is different depending on the magnitude of the threshold value of the RNTP may be reflected on the amount of information. Therefore, in regard to the transmission system according to this embodiment, the communication apparatus 600 may notify other nodes of a relatively accurate amount of the precoding (beamforming) information (for example, the number of PMI lists). In addition, in regard to the transmission system according to this embodiment, since the communication apparatus 600 may set the number of PMIs, which is necessary to a minimum, in response to a magnitude of an amount of interference applied to other cells for each cell (component carrier or the like), the communication apparatus 600 may further reduce the overhead related to the PMI information while reducing the ICI.

Here, as described above, one component carrier represents any large frequency band such as 20 MHz.

Fourth Embodiment

Figure 17:
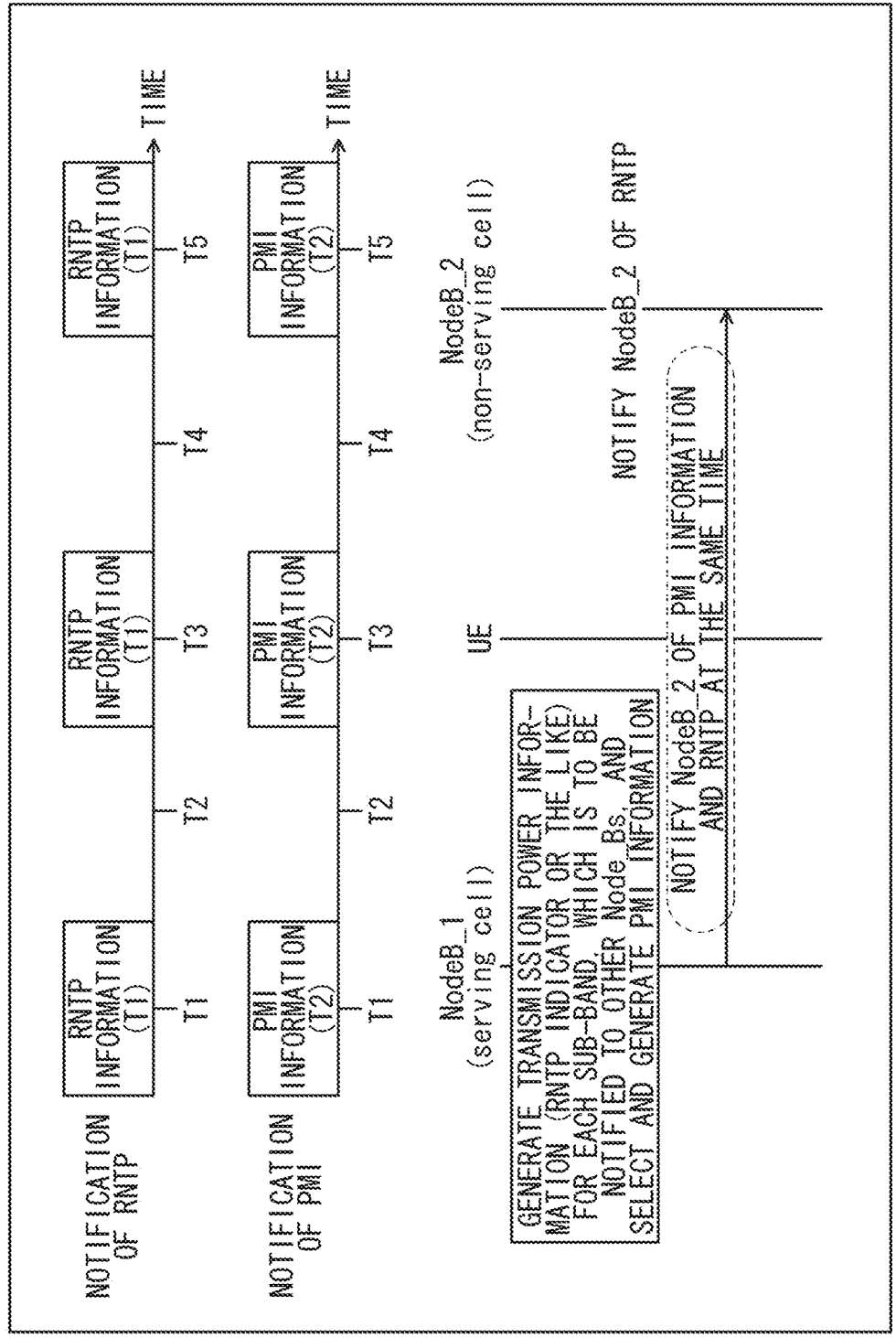
FIG. 17 is a diagram illustrating a method of notifying other nodes of an indicator of RNTP and the PMI list at the same time.

In the above-described embodiment, description was made with respect to a method in which in response to the indicator of 1 (0) of the RNTP for each frequency resource, an amount of the precoding (beamforming) information (for example, the number of PMI lists) in a corresponding band is made to increase (decrease) and then this information is notified to other nodes. Therefore, in regard to a transmission system according to the fourth embodiment, a method of combining the indicator of the RNTP of LTE Rel. 8 to this embodiment will be described with reference to FIG. 17. FIG. 17 shows a diagram illustrating a method of notifying other nodes of the indicator of the RNTP and the PMI list at the same time.

In FIG. 17, the indicator of the RNTP, and the selected PMI list that is selected by the extended PMI list selecting unit 131 in the above-described embodiment are notified from the communication apparatus 600 to other nodes at the same time. For explanation, in FIG. 17, the communication apparatus 600 is expressed as NodeB_1 and another node is expressed as NodeB_2.

In addition, in FIG. 17, two pieces of information (the indicator of the RNTP and the PMI list) are notified at the same time at timings of times T1, T3, and T5. Therefore, since the NodeB_2 may acquire other-cell interference information in a frequency domain and a spatial domain from the NodeB_1, the NodeB_2 may perform the ICIC control of the frequency domain, or the frequency domain and spatial domain in a flexible manner.

However, since the NodeB_1 notifies the NodeB_2 of information of the magnitude of the transmission signal power for each frequency resource in surplus at times T1, T3, and T5 at which the two pieces of information (the indicator of the RNTP and the PMI list) are notified, the above-described method has another problem in that traffic on the backhaul is made to be heavy.

This is because the amount of information of the PMI list for each frequency resource is determined on the basis of the magnitude of the transmission signal power of the frequency resource in a corresponding band and therefore the abundance in the amount of information of the PMI list implicitly represents the magnitude of the transmission signal power of the frequency resource in a corresponding band. Therefore, at times T1, T3, and T5, the NodeB_2 acquires the information of the magnitude of the transmission signal power of the frequency resource of the NodeB_1 from two pieces of information of the indicator of the RNTP and the PMI list in a duplicating manner.

Therefore, in a modification example of this embodiment, the communication apparatus 600 make a notification cycle different in a method of notifying other nodes of information of transmission power (density), (normalized) transmission signal energy (density), or a magnitude (good or bad) of a communication quality for each frequency resource, and information of precoding (beamforming) (for example, the number of PMI lists) at a corresponding frequency resource position.

Figure 18:
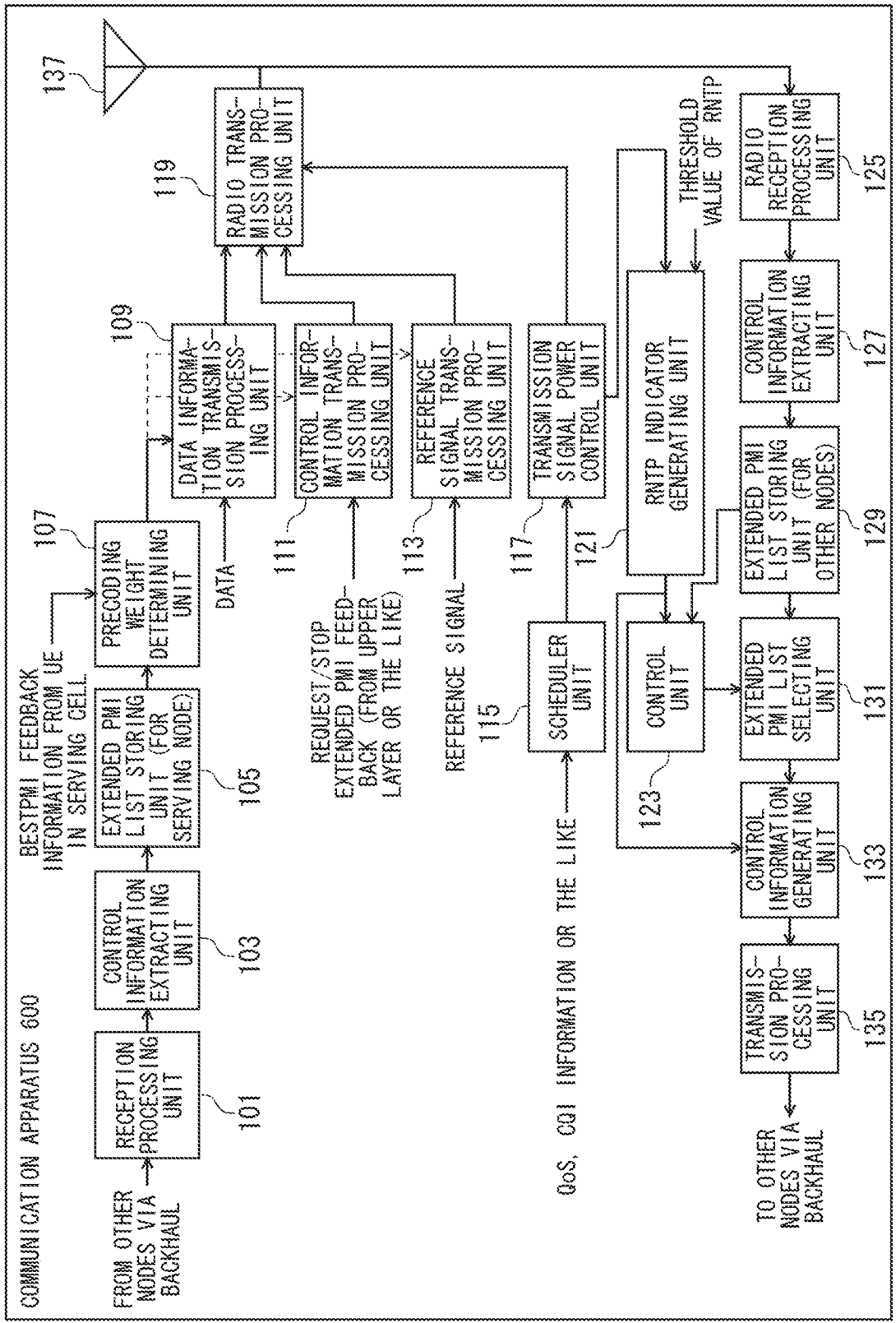
FIG. 18 is a block diagram illustrating a configuration of a communication apparatus 600 according to a fourth embodiment.

FIG. 18 shows a block diagram of the communication apparatus 600. The communication apparatus 600 shown in FIG. 18 includes a reception processing unit 101, a control information extracting unit 103, an extended PMI list storing unit (for a serving node) 105, a precoding weight determining unit 107, a data information transmission processing unit 109, a control information transmission processing unit 111, a reference signal transmission processing unit 113, a scheduler unit 115, a transmission signal power control unit 117, a radio transmission processing unit 119, an RNTP indicator generating unit 121, a control unit 123, a radio reception processing unit 125, a control information extracting unit 127, an extended PMI list storing unit (for other nodes) 129, an extended PMI list selecting unit 131, a control information generating unit 133, a transmission processing unit 135, and a transmission and reception antenna 137.

Here, an operation of the communication apparatus 600 shown in FIG. 18 is different from the operation of the communication apparatus 100A shown in FIG. 6 is in an operation of the control unit 123 and an operation of the extended PMI list selecting unit 131. Hereinafter, in this embodiment, the operation of the control unit 123 and the operation of the extended PMI list selecting unit 131 will be mainly described.

Figure 19:
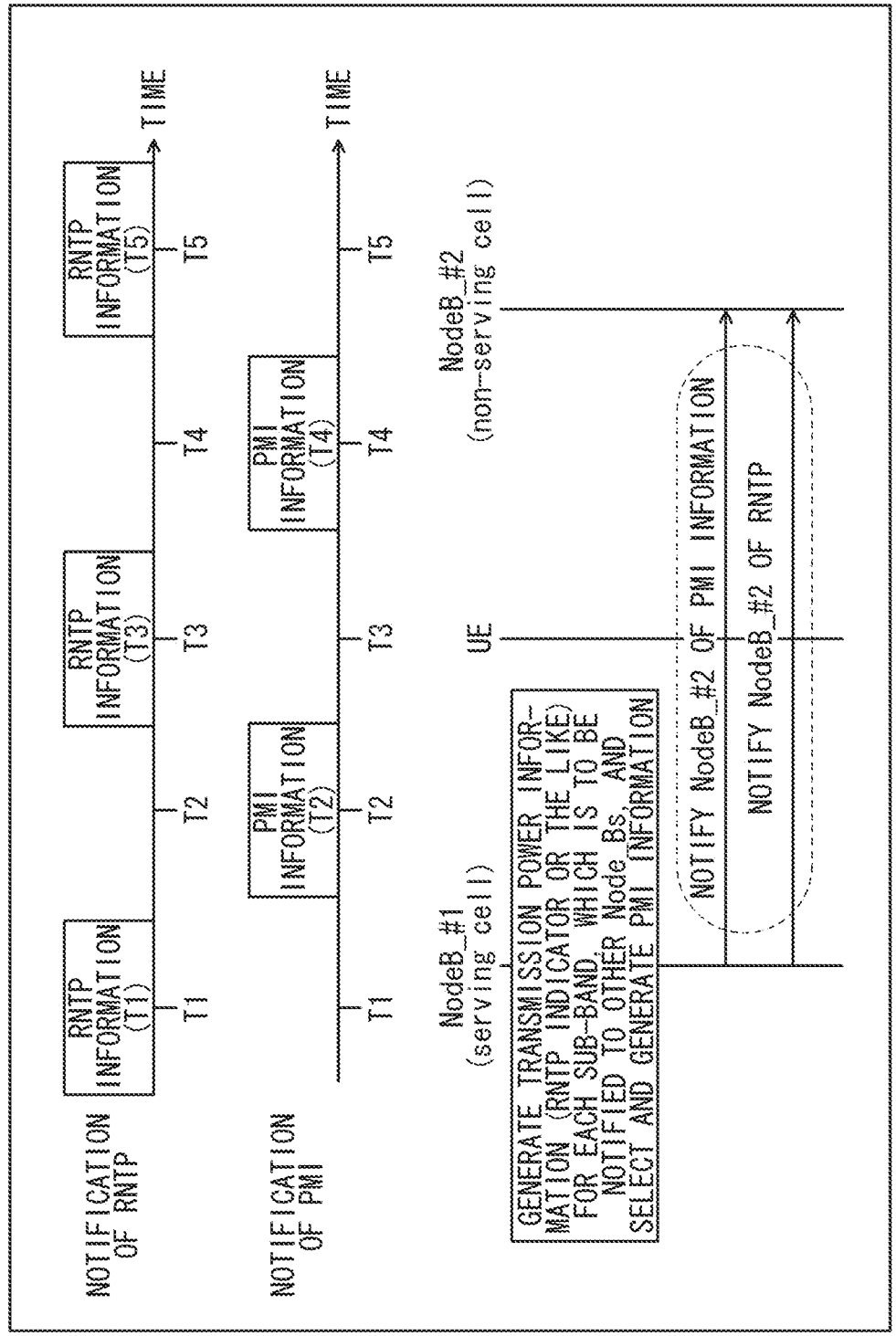
FIG. 19 is a diagram illustrating a method (1) of notifying other nodes of the RNTP and the PMI list in such a manner that a notification timing of RNTP and a notification timing of a PMI list are shifted from each other.

In regard to a transmission system according to the fourth embodiment, a timing at which the indicator of the RNTP and the PMI list are notified will be described with reference to FIG. 19. FIG. 19 shows a diagram illustrating a method (1) of notifying other nodes of the RNTP and the PMI list in such a manner that a notification timing of the RNTP and a notification timing of the PMI are made different from each other.

In addition, for explanation, in FIG. 19, the communication apparatus 600 is expressed as NodeB #1 (serving cell) and another node that is a notification destination of the indicator of the RNTP and the PMI list is expressed as NodeB #2 (non-serving cell).

As shown in FIG. 19, as a notification timing that is set by the control unit 123, (1) a notification timing of the RNTP from the NodeB #1 to the NodeB #2 includes T1, T3, and T5, and (2) a notification timing of the PMI list from the NodeB #1 (serving cell) to the NodeB #2 (non-serving cell) includes T2 and T4. In addition, PMI information of the PMI list at T2 and T4 is PMI information that is selected from future transmission signal power information (indicator of RNTP) at points of time T2 and T4 on the basis of any method of the above-described embodiments and modification example.

That is, in the transmission system according to the fourth embodiment, the communication apparatus 600 allows the control unit 123 to set both of the notification timing of the RNTP from the NodeB_#1 (serving cell) to the NodeB_#2 (non-serving cell) and the notification timing of the PMI list from the NodeB_#1 (serving cell) to the NodeB_#2 (non-serving cell) in such a manner that these notification timings are different from each other.

In addition, since the extended PMI list selecting unit 131 determines the information of the number of PMI lists on the basis of the magnitude (the indicator of the RNTP (0 or 1)) of future transmission signal power at each point of time, the NodeB, which receives both of the information, may implicitly learn, from an amount of the precoding (beamforming) information (for example, the number of PMI lists) at a frequency resource position, "information of transmission power (density) of a corresponding cell at the corresponding frequency resource, (normalized) transmission signal energy (density), or a magnitude (good or bad) of a communication quality" that is information of a magnitude of other-cell interference power.

As shown in FIG. 19, for example, the NodeB_#2 is not notified of the RNTP information at time T2 from the NodeB_#1, but the NodeB_#2 may implicitly learn, from the PMI information notified from the NodeB_#1 at time T2, "information of transmission power (density) of a corresponding cell at the corresponding frequency resource, (normalized) transmission signal energy (density), or a magnitude (good or bad) of a communication quality" that is information of a magnitude of other-cell interference power.

Therefore, at all of the timings at which the information of the RNTP or the PMI list is received, the NodeB_#2 may acquire the information of the magnitude of the interference power from other cells (node_#1). Therefore, this information may be used for CS.

Figure 20:
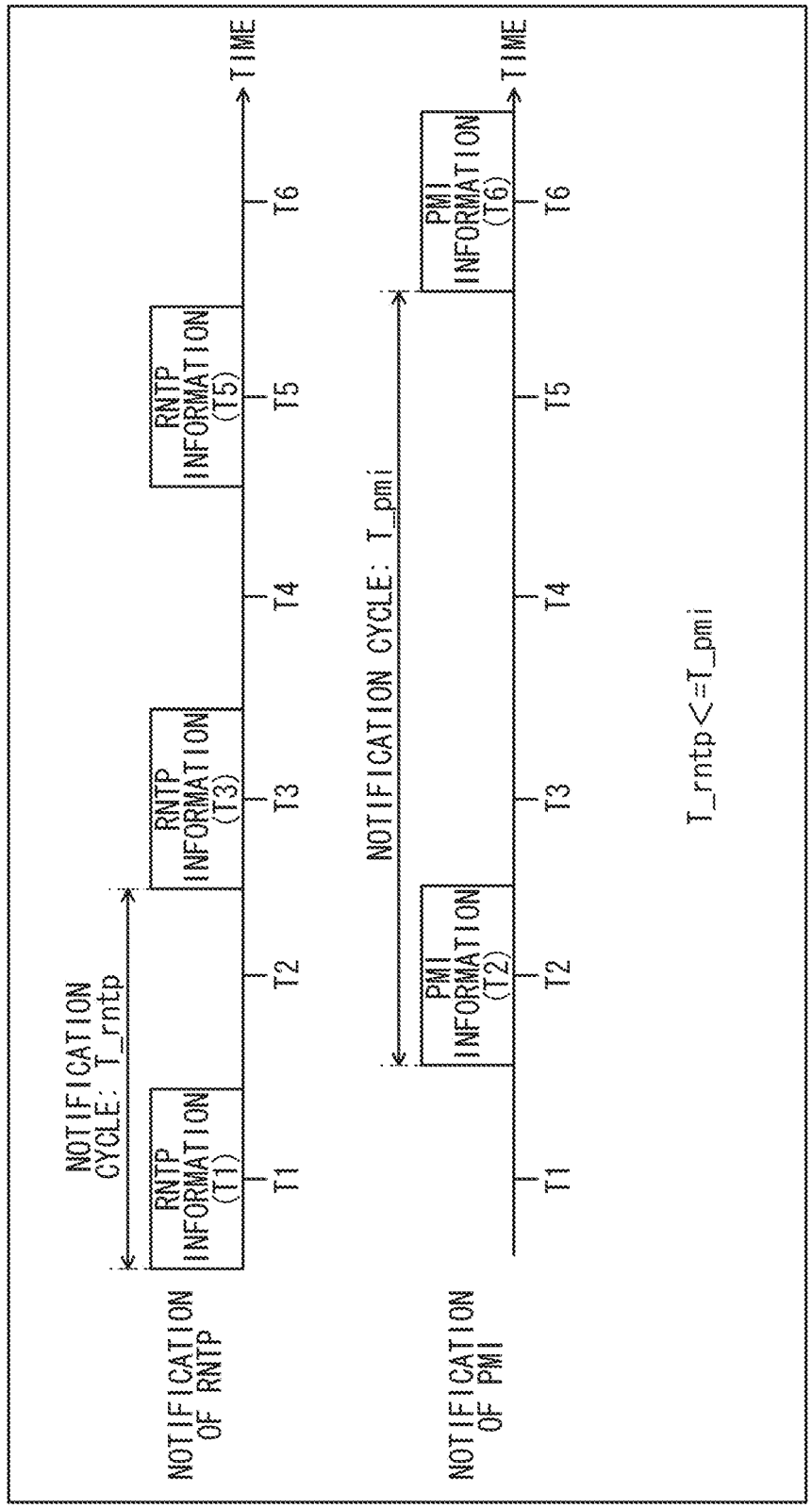
FIG. 20 is a diagram illustrating a method (2) of notifying other nodes of the RNTP and the PMI list in such a manner that the notification timing of RNTP and the notification timing of a PMI list are shifted from each other.

In addition, in this embodiment, the communication apparatus 600 may allow the control unit 123 to set the notification cycle of the information of precoding (beamforming) (for example, the number of PMI lists) to be longer than the notification cycle of the information of transmission power (density), (normalized) transmission signal energy (density), or the magnitude (good or bad) of a communication quality for each frequency resource. A description will be made with respect to this case with reference to FIG. 20. FIG. 20 shows a diagram illustrating a method (2) of notifying other nodes of the RNTP and the PMI list in such a manner that the notification cycle of RNTP and the notification cycle of a PMI list are made to be different from each other.

As shown in FIG. 20, the control unit 123 sets the notification cycle of the transmission power from the NodeB_#1 (serving cell) to the NodeB_#2 (non-serving cell) every T-rntp, and sets the notification cycle of an extended PMI from the NodeB_#1 to the NodeB_#2 to T_pmi (T rntp T_pmi). In addition, PMI information of the PMI list at T2 and T6 is PMI information that is selected from future transmission signal power information (indicator of RNTP) at points of time T2 and T6 on the basis of any method of the above-described embodiments and modification example.

Therefore, in this embodiment, the communication apparatus 600 preferentially performs notification of the "information of transmission power (density) of a corresponding cell at the corresponding frequency resource, (normalized) transmission signal energy (density), or a magnitude (good or bad) of a communication quality" that is information of a magnitude of other-cell interference power with high frequency compared to the information of the RNTP or the PMI list, such that the notification of the information of a case in which the other-cell interference power is small (useless precoding (beamforming) in a frequency resource that is not necessary for the coordinated ICIC) (for example, the number of PMI lists) may be avoided. That is, the overhead may be reduced.

In addition, the NodeB_#2 that is a reception node may receive the "information of transmission power (density) of a corresponding cell at the corresponding frequency resource, (normalized) transmission signal energy (density), or a magnitude (good or bad) of a communication quality" that is information of a magnitude of other-cell interference power with high frequency. Therefore, since only a UE of a serving cell may be considered at a frequency resource in which the other-cell interference power is small, precoding (beamforming) may be performed in a flexible manner without performing a useless calculation related to other-cell interference.

In addition, in the above-described embodiment, description was made with respect to a case in which the communication apparatus 600 allows the control unit 123 to set the notification cycle of the information of precoding (beamforming) (for example, the number of PMI lists) to be longer than the notification cycle of the information of transmission power (density), (normalized) transmission signal energy (density), or the magnitude (good or bad) of a communication quality for each frequency resource. Conversely, the notification cycle of the information of precoding (beamforming) (for example, the number of PMI lists) may be set to be shorter than the notification cycle of the information of transmission power (density), (normalized) transmission signal energy (density), or the magnitude (good or bad) of a communication quality for each frequency resource.

For example, to avoid a dynamic variation in the other-cell interference, a node may use a transmission power control method in which transmission is performed with constant power for a given time period, and in this case, the degree of importance of the information of future transmission signal power (indicator of the RNTP) becomes lower than the degree of importance of the precoding (beamforming) (for example, the number of PMI lists) information. Therefore, the precoding (beamforming) may be operated among a plurality of cells in an effective manner under a circumstance in which the dynamic variation in transmission signal power (other-cell interference when seen from other cells) is small by using the above-described method.

In addition, in this embodiment, the communication apparatus 600 may only transmit the PMI list to the NodeB_#2 without transmitting the indicator of the RNTP to the NodeB_#2. Therefore, as described above, in the transmission system according to this embodiment, since the communication apparatus 600 may implicitly learn information of transmission signal power (magnitude) of other cells from the amount of information (for example, the number of PMI lists) of the extended PMI list, the overhead related to the amount of control information of the RNTP may be eliminated.

In addition, in each of the above-described embodiments, the communication apparatuses (base stations (NodeBs)) are adopted as nodes that coordinate the precoding (beamforming) information with each other, but it is not limited thereto. For example, a macro station (NodeB), a micro station (NodeB), a Pico station (NodeB), a Home station (NodeB), an overhang antenna (RRE: Remote Radio Head, RRE=Remote Radio Equipment), and the like may be exemplified, and the communication apparatuses may be adopted to these. In addition, items of user equipment may be set as nodes, and a backhaul between the items of user equipment may be connected in a radio manner and may be applied to coordination between the items of user equipment. In this manner, the same effect as the above-described embodiments may be obtained.

In addition, in each of the above-described embodiments, description was made with respect to a case in which the backhaul between nodes is connected with a wire network such as X2, but the backhaul may be applied to a configuration in which the coordinated nodes are connected with a radio network. For example, the backhaul may be applied to between a relay node and the macro NodeB, between relays, or the like, in which the backhaul is configured with a radio manner. In this manner, the same effect as the above-described embodiments may be obtained.

In addition, in each of the above-described embodiments, description was made with respect to a case in which other nodes are notified of the precoding (beamforming) information in a physical resource (a sub-carrier, a resource element, a resource block, or the like) in the frequency domain, but it is not limited thereto. It may be applied to other physical resources such as time, code, . . . , domain, or the like, instead of the frequency. In this manner, the same effect as each of the above-described embodiments may be obtained.

In addition, in each of the above-described embodiments, description was made with respect to an example in which other nodes are notified of the precoding (beamforming weight) information in a physical resource (a sub-carrier, a resource element, a resource block, or the like) of the frequency domain, but it is not limited thereto. For example, it may be applied with respect to a logical resource (for example, a virtual sub-carrier, a virtual resource element, a virtual resource block, or the like). In this manner, the same effect as each of the above-described embodiments may be obtained while restrictions of a physical resource that transmits a transmission signal are not imposed.

In addition, in each of the above-described embodiments, the information of the transmission signal power (for example, RNTP) may be notified simultaneously together with the information of the extended PMI. In this manner, an appropriate precoding weight may be selected from the notified extended PMI information by considering the information of the transmission signal power in other nodes. That is, since the information of the other-cell interference power in the frequency domain, and the precoding (beamforming) information of the other-cell interference in the spatial domain may be acquired at the same time, the ICIC control of the frequency domain and the spatial domain may be performed in a flexible manner.

In addition, in each of the above-described embodiments, description was made with respect to a case in which successive frequency resources are set as a group and the extended PMI with respect to this group is notified, but not-successive frequency resources may be set as a group and the extended PMI may be notified.

In addition, in each of the above-described embodiments, a PMI other than a worst (best) PMI may be notified without notifying the worst (best) PMI as the extended PMI information such as best (worst) PMI. For example, a second worst (best) PMI is notified. In this manner, in regard to the entirety of a plurality of cells, when performing notification of the second worst (best) PMI instead of the worst (best) PMI, this may maximize throughput in the entirety of the plurality of cells from a viewpoint of total optimization, and the operation may be performed at this case in an effective manner.

In addition, in each of the above-described embodiments, description was made with respect to a case in which the PMI is notified as beamforming (precoding) information, but it is not limited thereto. In the case of performing notification of explicit channel information such as a covariance matrix of a propagation channel (or a transmission signal or a reception signal) and a channel matrix, the number of quantization bits of the information may be correlated with information or the like (for example, an RNTP value) about the magnitude of the transmission signal power or the like. In this manner, the same effect as that described above may be obtained.

In addition, in each of the above-described embodiments, the number of the extended PMIs that is notified (or granularity) may be changed in correlation with the number of antenna ports (codebook size) for each node. For example, in a case where the number of the transmission antenna ports (codebook size) of the node (cell) is large, accompanying this, the amount of the beamforming (precoding) information and the number of PMIs that is notified may be increased. In this manner, in the case of other configurations such as the number of antenna ports is different in each node, the optimization may be made in the entirety of system.

Figure 21A:
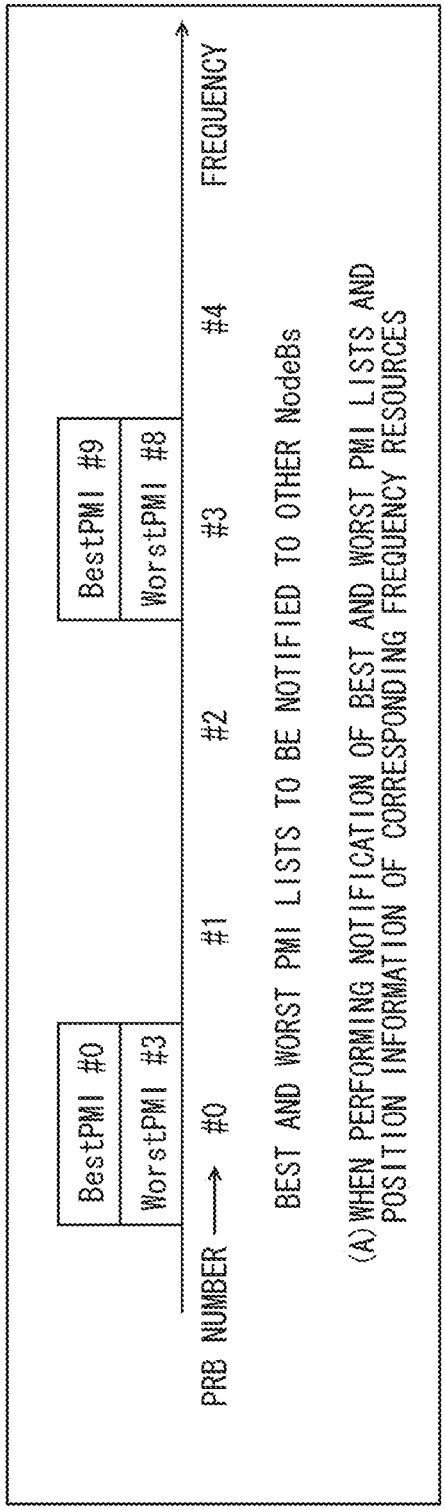
FIGS. 21A and 21B are diagrams illustrating a method of transmitting two pieces of information at the same time with the specific same frequency resource.
Figure 21B:
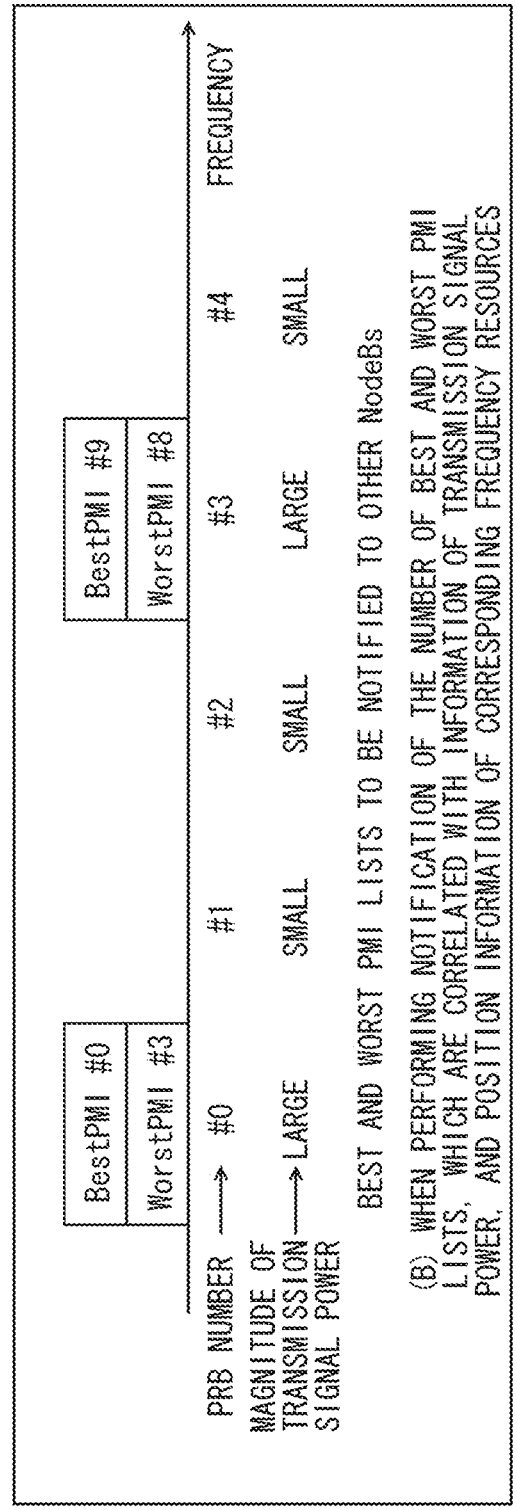

In addition, in each of the above-described embodiments, description was made with respect to a configuration in which any one of information of the best PMI (PMI whose use by other cells is limited (prohibited) and not encouraged) or information of worst PMI (PMI whose use by other cells is encouraged) is notified for each frequency resource, but it is not limited thereto. The two pieces of information may be transmitted at the same time with any specific same frequency resource that is selected. FIGS. 21A and 21B show an example thereof. FIGS. 21A and 21B are diagrams illustrating a method of transmitting two pieces of information at the same time with the specific same frequency resource.

FIG. 21A shows a case of performing notification of best and worst PMI lists of PRB numbers of #0 and #3 and position information of corresponding frequency resources. In addition, FIG. 21B shows a case of performing notification of the number of the best and worst PMI lists, which is correlated with the information of the transmission signal power, and the position information of the corresponding frequency resources, and this case corresponds to a case of performing notification of the best and worst PMI lists of PRB numbers of #0 and #3 in which the transmission signal power is large and the position information of corresponding frequency resources.

In this manner, even in a case where a transmission mode of the CoMP is different in each frequency resource for each cell, for example, even in a case where a CB mode is adopted in a cell 1 within an adjacent node, and JP is adopted in a cell 2 within the adjacent node as the CoMP, it is possible to cope with this case at the same time.

In addition, in each of the above-described embodiments, description was made with respect to a case in which a serving cell transmits an extended PMI (beamforming/precoding) request signal toward a UE that is connected to a serving cell, and the UE received the signal selects, for example, a PMI list (PMI list whose use by other cells is restricted (prohibited) and is recommended not to be encouraged), which generates large other-cell interference with respect to the serving UE, and feeds back this information to the serving cell.

However, the UE that is connected to the serving cell may follow examples described below while not transmitting the extended PMI (beamforming/precoding) request signal. For example, as is the case with LTE Rel. 8, the serving cell transmits the PMI feedback request signal with respect to a UE in a serving cell (transmits a PMI (for example, a best PMI) request signal that is recommended to be used with respect to the serving UE), and the UE feeds back this information to the serving cell. The serving cell generates a list of the best PMIs that is fed back for each frequency band. In addition, in lists made up of a plurality of best PMIs, only a PMI, which corresponds to the CoMP mode, is selected as a PMI list to be notified to other nodes for each frequency band (in other words, a PMI of a non-CoMP mode is not selected as a PMI to be notified to other nodes). In addition, only the PMI that is selected for each frequency band is notified to other nodes. With this configuration, the same effect as that described above may be obtained while maintaining a feedback mechanism of LTE Rel. 8, that is, backward compatibility.

In addition, in each of the above-described embodiments, other nodes may also be notified of a threshold value of the RNTP that is used for each cell (component carrier) of each node. In this manner, the node, which receives information of precoding (beamforming) and the information of the PMI list, may independently determine the magnitude of an amount of interference from other cells from a fact in which implication of the indicator (0 or 1) of the RNTP is different depending on the magnitude of the threshold value (for example, since the maximum power that is permitted is different in NodeB, Relay, and Home NodeB, the reception node may independently determine the magnitude of the ICI from the permitted maximum power and the threshold value of the RNTP in an accurate manner). Therefore, since this may be used in determining whether to take the information of precoding (beamforming) and the information of the PMI list to what extent or not to take this information, the flexibility in the selection of the PMI list may be further increased.

In addition, in each of the above-described embodiments, in a case where the amount of the beamforming/precoding information (the number of the extended PMIs that is notified) and the information of the magnitude of the transmission signal power are correlated with each other, and the RNTP and the beamforming/precoding (extended resource) information for each frequency resource is notified, since the information of the transmission power to other cells may be implicitly learned from the amount of the beamforming/precoding information (the number of extended PMIs that is notified), the information of frequency resource position to which the information of beamforming/precoding (extended PMI) corresponds may not be transmitted. Therefore, the overhead may be further reduced.

In addition, in each of the above-described embodiments, description was made with respect to a method of performing notification of the precoding (for example, PMI) information or beamforming weight information between nodes with the CoMP of the DL made as an object, but in regard to the CoMP of UL (uplink), this description may be also similarly applied to a method of performing notification the precoding (for example, PMI) information or the beamforming weight information over a backhaul in coordinated beamforming between UEs that are connected to a plurality of cells. Therefore, the same effect as each of the above-described embodiment may be obtained.

In addition, in the above-described embodiments, description was made with respect to an antenna, but this description may be also similarly applied to an antenna port. The antenna port represents a logical antenna that is made up of one or a plurality of physical antennas. That is, the antenna port does not necessarily represent only one physical antenna, and the antenna port may represent an array antenna that is made up of a plurality of antennas.

For example, in LTE, the number of physical antennas making up the antenna port is not defined, and the antenna port is defined with a minimum unit in which a base station may transmit a different reference signal. In addition, the antenna port may be defined with a minimum unit that multiplies weighting of a precoding vector.

In addition, each functional block that is used in each of the above-described embodiments is typically realized by an LSI that is an integrated circuit. The functional blocks may be individually composed of a single chip, and the functional blocks may be composed of a single chip so as to include parts or the entirety of the functional blocks. Here, the LSI is exemplified, but this may be called an IC, a system LSI, a super LIS, or an ultra LSI depending on the degree of integration.

In addition, a type of an integrated circuit is not limited to the LSI, and the integrated circuit may be realized by a dedicated circuit or a general-purpose processor. An FPGA (Field Programmable Gate Array), which may be programmed after manufacturing the LSI, or a reconfigurable processor in which connection or setting of circuit cells inside the LSI is may be reconfigured may be used.

In addition, when a technology of integrated circuits that substitutes the LSI appears according to development of a semiconductor technology or a separate technology derived therefrom, the integration of the functional block may be naturally performed by using this technology. Application to biotechnology or the like may be possible.

The invention was described in detail with reference to specific embodiments, but it should be understood by those skilled in the art that various changes and modifications may be made without departing from the sprit and scope of the invention.

The present application is based upon Japanese Patent Application No. 2010-003332 filed on Jan. 8, 2010, the contents of which are incorporated herein by reference.

INDUSTRIAL APPLICABILITY

The communication apparatus and communication method according to the invention have an effect of reducing overhead related to information, which are notified over a backhaul, while maintaining an ICI reduction effect by DL coordinated CoMP (CB, JP, or the like) among a plurality of nodes, and therefore they are effective as a radio communication apparatus or the like.

REFERENCE SIGNS LIST 100, 100A, 600: Communication apparatus
101: Reception processing unit
103: Control information extracting unit
105: Extended PMI list storing unit (for a serving node)
107: Precoding weight determining unit
109: Data information transmission processing unit
111: Control information transmission processing unit
113: Reference signal transmission processing unit
115: Scheduler unit
117: Transmission signal power control unit
119: Radio transmission processing unit
121: Indicator generating unit
123: Control unit
125: Radio reception processing unit
127: Control information extracting unit
129: Extended PMI list storing unit (for other nodes)
131: Extended PMI list selecting unit
133: Control information generating unit
135: Transmission processing unit
137: Transmission and reception antenna

The invention claimed is:

1. A communication node, comprising:
a receiver which, in operation, receives Reference Signal Received Power (RSRP) measurement reports from one or more User Equipments (UEs) in a cell belonging to the communication node;
a controller which, in operation,
determines a frequency resource position among plural frequency resource positions, wherein the frequency resource position is associated with Coordinated Multi-Point (CoMP) information including a benefit metric indicative of a degree of benefit of CoMP usage ranging from best to worst, and
generates frequency resource position information in a bit map, wherein the frequency resource position is represented by 1 or 0, with 0 indicating the frequency position with no utilization constraints; and
a transmitter which, in operation, transmits the CoMP information, the frequency resource position information, and a cell ID of a cell to which the determined frequency resource position belongs, to another communication node to perform inter-eNB CoMP.

2. The communication node according to claim 1, wherein the transmitter, in operation, transmits the CoMP information, the frequency resource position information, and the cell ID in a group for each of a plurality of transmit-destination cells.

3. The communication node according to claim 1, wherein the frequency resource position information includes at least one of:
the bit map in units of Physical Resource Blocks (PRBs);
an initial PRB number and a terminal PRB number;
an initial PRB number and a bandwidth of frequency resources; and
a terminal PRB number and a bandwidth of frequency resources.

4. The communication node according to claim 1, wherein the transmitter, in operation, transmits the CoMP information, the frequency resource position information, and the cell ID via a backhaul provided by an X2 interface.

5. The communication node according to claim 1, wherein the transmitter, in operation, periodically transmits the CoMP information and the frequency resource position information.

6. The communication node according to claim 1, wherein the controller, in operation, determines the frequency resource position based on at least one of:
a transmission mode of each frequency resource,
transmission power information of each frequency resource,
positional information of the UEs, and
the RSRP measurement reports of the UEs.

7. The communication node according to claim 1, wherein the CoMP information indicates prohibition, restriction, encouragement, or non-encouragement of use of the CoMP in another cell or adjacent communication nodes.

8. The communication node according to claim 1, wherein the frequency resource position information indicates whether the CoMP information is present for each frequency resource.

9. The communication node according to claim 1, wherein the transmitter, in operation, transmits the RSRP measurement reports to said another communication node.

10. The communication node according to claim 1, wherein the benefit metric of the CoMP information takes one of a plurality of values from a maximum value to a minimum value.

11. The communication node according to claim 1, wherein the plural frequency resource positions are not consecutive.

12. A communication method, comprising:
receiving, at a communication node, Reference Signal Received Power (RSRP) measurement reports from one or more User Equipments (UEs) in a cell belonging to the communication node;
determining a frequency resource position among plural frequency resource positions, wherein the frequency resource position is associated with Coordinated Multi-Point (CoMP) information including a benefit metric indicative of a degree of benefit of CoMP usage ranging from best to worst;
generating frequency resource position information in a bit map, wherein the frequency resource position is represented by 1 or 0, with 0 indicating the frequency position with no utilization constraints; and
transmitting the CoMP information, the frequency resource position information, and a cell ID of a cell to which the determined frequency resource position belongs, to another communication node to perform inter-eNB CoMP.

13. The communication method according to claim 12, comprising transmitting the CoMP information, the frequency resource position information, and the cell ID in a group for each of a plurality of transmit-destination cells.

14. The communication method according to claim 12, wherein the frequency resource position information includes at least one of:
the bit map in units of Physical Resource Blocks (PRBs);
an initial PRB number and a terminal PRB number;
an initial PRB number and a bandwidth of frequency resources; and
a terminal PRB number and a bandwidth of frequency resources.

15. The communication method according to claim 12, comprising transmitting the CoMP information, the frequency resource position information, and the cell ID via a backhaul provided by an X2 interface.

16. The communication method according to claim 12, comprising periodically transmitting the CoMP information and the frequency resource position information.

17. The communication method according to claim 12, comprising determining the frequency resource position based on at least one of:
a transmission mode of each frequency resource,
transmission power information of each frequency resource,
positional information of the UEs, and
the RSRP measurement reports of the UEs.

18. The communication method according to claim 12, wherein the CoMP information indicates prohibition, restriction, encouragement, or non-encouragement of use of the CoMP in another cell or adjacent communication nodes.

19. The communication method according to claim 12, wherein the frequency resource position information indicates whether the CoMP information is present for each frequency resource.

20. The communication method according to claim 12, comprising transmitting the RSRP measurement reports to said another communication node.

21. The communication method according to claim 12, wherein the benefit metric of the CoMP information takes one of a plurality of values from a maximum value to a minimum value.

22. The communication method according to claim 12, wherein the plural frequency resource positions are not consecutive.

23. A communication node, comprising:
a receiver which, in operation, receives Reference Signal Received Power (RSRP) measurement reports from one or more User Equipments (UEs) in a cell belonging to the communication node;
a controller which, in operation,
determines a frequency resource position among plural frequency resource positions, wherein the frequency resource position is associated with Coordinated Multi-Point (CoMP) information including a benefit metric indicative of a degree of benefit of CoMP usage ranging from best to worst, and
generates frequency resource position information in a bit map, wherein the frequency resource position is represented by 1 or 0, with 1 or 0 indicating an interference protected resource (large inter-cell interference resource) or a no interference protected resource (small inter-cell interference resource); and a transmitter which, in operation, transmits the CoMP information, the frequency resource position information, and a cell ID of a cell to which the determined frequency resource position belongs, to another communication node to perform inter-eNB CoMP.

\* \* \* \* \*